(12) United States Patent
Lu et al.

(10) Patent No.: US 8,769,327 B2
(45) Date of Patent: Jul. 1, 2014

(54) BATTERY CHARGER MANAGEMENT SYSTEM AND METHOD FOR CONTROLLING A CHARGE CURRENT BY INDIRECTLY DETERMINING THE TYPE AND CHARACTERISTICS OF A BATTERY VIA A CURRENT CONSUMED BY A CHARGER

(71) Applicant: Advanergy, Inc., Winnetka, CA (US)

(72) Inventors: Jin Lu, Oak Park, CA (US); Todd Scott Kelly, Winnetka, CA (US); Lee Cheung, Thousand Oak, CA (US)

(73) Assignee: Advanergy, Inc., Winnetka, CA (US)

( * ) Notice: Subject to any disclaimer, the term of this patent is extended or adjusted under 35 U.S.C. 154(b) by 0 days.

(21) Appl. No.: 13/840,022

(22) Filed: Mar. 15, 2013

(65) Prior Publication Data

US 2013/0214730 A1 Aug. 22, 2013

Related U.S. Application Data

(63) Continuation-in-part of application No. 13/644,995, filed on Oct. 4, 2012, now Pat. No. 8,583,955, and a (Continued)

(51) Int. Cl.
*G06F 1/00* (2006.01)
*G06F 1/26* (2006.01)
*H02J 7/00* (2006.01)

(52) U.S. Cl.
USPC ............ 713/324; 713/340; 320/107

(58) Field of Classification Search
USPC ............ 713/324, 34, 320, 340; 320/107, 162
See application file for complete search history.

(56) References Cited

U.S. PATENT DOCUMENTS 3,955,463 A 5/1976 Hoehn
4,105,862 A 8/1978 Hoehn (Continued)

FOREIGN PATENT DOCUMENTS

KR 10-0489635 B1 5/2005
WO WO 9608068 A1 3/1996

OTHER PUBLICATIONS (Author Unknown); "Battery Life (and Death)"; Electropaedia; At least as early as Oct. 4, 2011; http://www.mpoweruk.com/life.htm; 8 pp.

(Continued)

*Primary Examiner* — Thomas Lee
*Assistant Examiner* — Phil Nguyen
(74) *Attorney, Agent, or Firm* — David W. Carstens; Kevin M. Klughart; Carstens & Cahoon, LLP

(57) ABSTRACT

A battery charger management system/method implementing indirect execution of battery charging profiles is disclosed. The system utilizes a power source control unit (PSCU) to selectively switch a power supply source to a battery charging power supply (BCPS) that charges a battery. A power monitor control unit (PMCU) monitors the current consumed by the BCPS and reports this to the PSCU. The BCPS current consumption provides the PSCU a profile of the charging characteristics of the battery attached to the BCPS, allowing identification of the battery type and a determination of the optimal charging profile for the battery in its current charge state. The power source to the BCPS is switched by the PCCU in accordance with the determined optimal charging profile to optimally charge the battery. The PSCU may operate independently or in conjunction with wireless commands received from a mobile communication device (MCD).

30 Claims, 32 Drawing Sheets

Related U.S. Application Data continuation-in-part of application No. 13/645,080, filed on Oct. 4, 2012, now Pat. No. 8,443,071, and a continuation-in-part of application No. 13/645,044, filed on Oct. 4, 2012, and a continuation-in-part of application No. 13/644,795, filed on Oct. 4, 2012, now Pat. No. 8,478,450, and a continuation-in-part of application No. PCT/US2012/058788, filed on Oct. 4, 2012, and a continuation-in-part of application No. PCT/US2012/058781, filed on Oct. 4, 2012, and a continuation-in-part of application No. PCT/US2012/058771, filed on Oct. 4, 2012, and a continuation-in-part of application No. PCT/US2012/058761, filed on Oct. 4, 2012.

(60) Provisional application No. 61/542,811, filed on Oct. 4, 2011, provisional application No. 61/655,099, filed on Jun. 4, 2012, provisional application No. 61/698,288, filed on Sep. 7, 2012, provisional application No. 61/667,477, filed on Jul. 3, 2012, provisional application No. 61/661,100, filed on Jun. 18, 2012.

(56) References Cited

U.S. PATENT DOCUMENTS

| | | | |
|---|---|---|---|
| 4,188,854 | A | 2/1980 | Hoehn |
| 4,297,525 | A | 10/1981 | Bowden, Jr. |
| 4,304,957 | A | 12/1981 | Slater et al. |
| 4,366,343 | A | 12/1982 | Slater et al. |
| 4,389,535 | A | 6/1983 | Slater et al. |
| 4,414,427 | A | 11/1983 | Slater et al. |
| 4,424,406 | A | 1/1984 | Slater et al. |
| 5,672,952 | A | 9/1997 | Szepesi |
| 6,831,449 | B2 | 12/2004 | Nishida et al. |
| 6,937,947 | B2 | 8/2005 | Trembley |
| 7,772,802 | B2 | 8/2010 | Manico et al. |
| 8,204,990 | B1 | 6/2012 | Avery et al. |
| 2003/0167415 | A1 | 9/2003 | Odaohhara et al. |
| 2004/0066171 | A1 | 4/2004 | Mori |
| 2004/0193929 | A1 | 9/2004 | Kuranuki |
| 2004/0243826 | A1 | 12/2004 | Wang |
| 2006/0028178 | A1* | 2/2006 | Hobbs ............ 320/128 |
| 2006/0050464 | A1 | 3/2006 | Von Arx et al. |
| 2006/0052905 | A1 | 3/2006 | Pfingsten et al. |
| 2006/0230298 | A1 | 10/2006 | Bohlinger et al. |
| 2007/0080665 | A1* | 4/2007 | Paul et al. ............ 320/128 |
| 2009/0206797 | A1* | 8/2009 | Chueh et al. ............ 320/150 |
| 2009/0212736 | A1* | 8/2009 | Baarman et al. ............ 320/106 |
| 2009/0295232 | A1 | 12/2009 | McGinley et al. |
| 2010/0019718 | A1 | 1/2010 | Salasoo et al. |
| 2010/0164284 | A1 | 7/2010 | Lee et al. |
| 2011/0006737 | A1* | 1/2011 | Saligram et al. ............ 320/134 |
| 2011/0169453 | A1 | 7/2011 | Maruyama et al. |
| 2012/0159210 | A1 | 6/2012 | Hosaka |
| 2012/0242688 | A1 | 9/2012 | Boyle |
| 2012/0274287 | A1* | 11/2012 | Ree et al. ............ 320/162 |

OTHER PUBLICATIONS (Author Unknown); "Charging Lithium-ion"; Battery University; At least as early as Nov. 10, 2010; http://batteryuniversity.com/index.php/learn/article/charging_lithium_ion_batteries; 32 pp.

(Author Unknown); "Battery Management System (BMS)"; Electropaedia; At least as early as Oct. 4, 2011; http://www.mpoweruk.com/bms.htm#smartbats (smart battery); 8 pp.

(Author Unknown); "How to Prolong Lithium-based Batteries"; Battery University; At least as early as Oct. 21, 2010; http://batteryuniversity.com/learn/article/how_to_prolong_lithium_based_batteries; 34 pp.

Tarandeep Singh; "Secrets for Prolonging Lithium-based Battery Life"; Geeknizer; May 12, 2009; http://geeknizer.com/secrets-for-prolonging-lithium-based-batteries/#ixzz1Zju0wY6H; 4 pp.

(Author Unknown); "How to Enable/Disable Battery Care Function on Sony Vaio to Improve Battery Life"; Digital Pbk (Forum); At least as early as Augst 12, 2011; http://digitalpbk.com/hardware/sony-vaio-enable-battery-care-function-improve-battery-life; 4 pp.

(Author Unknown); "Wi-Fi Light Control"; Wi-Fi Planet (Forum); Jan. 31, 2009; http://forums.wi-fiplanet.com/showthread.php?t=9954; 5 pp.

(Author Unknown); "Why Hasn't Anyone Made Any WiFi Light Switches or Power Sockets?"; Wi-Fi Planet (Forum); Dec. 29, 2005; http://forums.wi-fiplanet.com/showthread.php?t=5584; 4 pp.

(Author Unknown); "Simplest Possible WiFi Remote Power Switch"; AVS (Forum); Sep. 15, 2011; http://www.avsforum.com/avs-vb/showthread.php?p=20977417; 5 pp.

(Author Unknown); "A Wi-Fi Controlled Power Outlet From iPhone?"; Yahoo Answers; Apr. 1, 2011; http://answers.yahoo.com/question/index?qid=20110401143408AAPQerm; 2 pp.

(Author Unknown); "Control Home Lights Via Internet With Your Computer or Wi-Fi Handheld Devices"; Squidoo; At least as early as Apr. 5, 2012; http://www.squidoo.com/control-home-lights-via-internet; 7 pp.

Harmony Gateway—Multi-Protocol HAN Gateway/Controller—Model #5010M; SimpleHomeNet; At least as early as Oct. 3, 2012; http://www.simplehomenet.com/proddetail.asp?prod=HarmonyGateway; 1 p.

"Battery Charging Tutorial"; ChargingChargesr.com; [Date]; http://www.chargingchargers.com; tutorials/charging.html; 4 pp.

"Battery Chargers and Charging Methods"; Electropaedia; [Date]; http://www.mpoweruk.com; chargers.htm; 8 pp.

"A bit about charging batteries"; from the XJ Electrical Help! Page; http://www.geocities.com/MotorCity/Speedway/7795; 1998 Aaron Berg; seca750@geocities.com.

* cited by examiner

*Prior Art*

FIG. 30
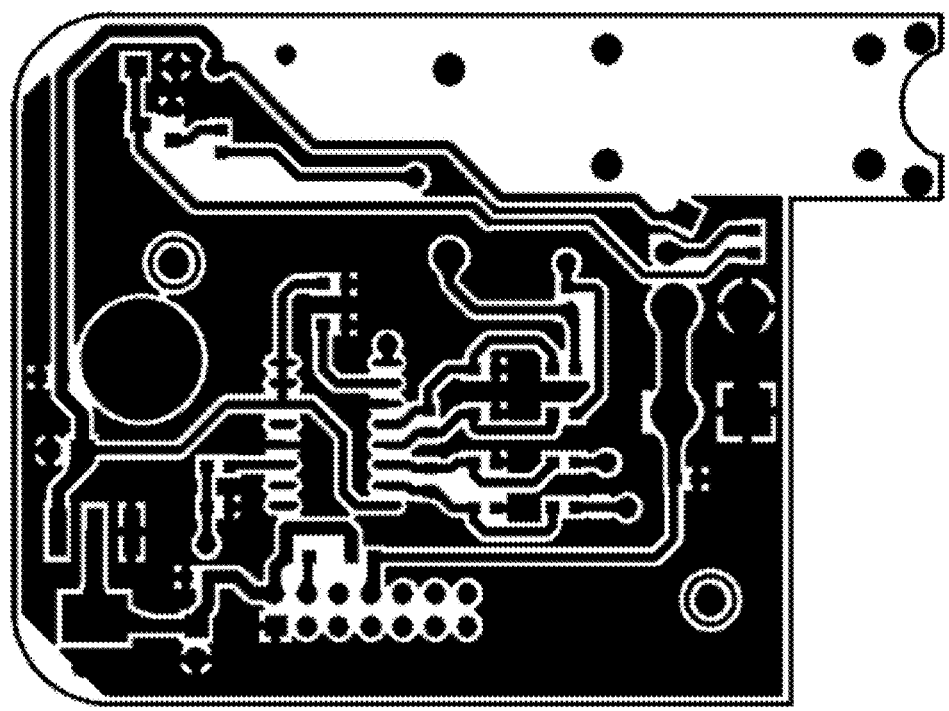
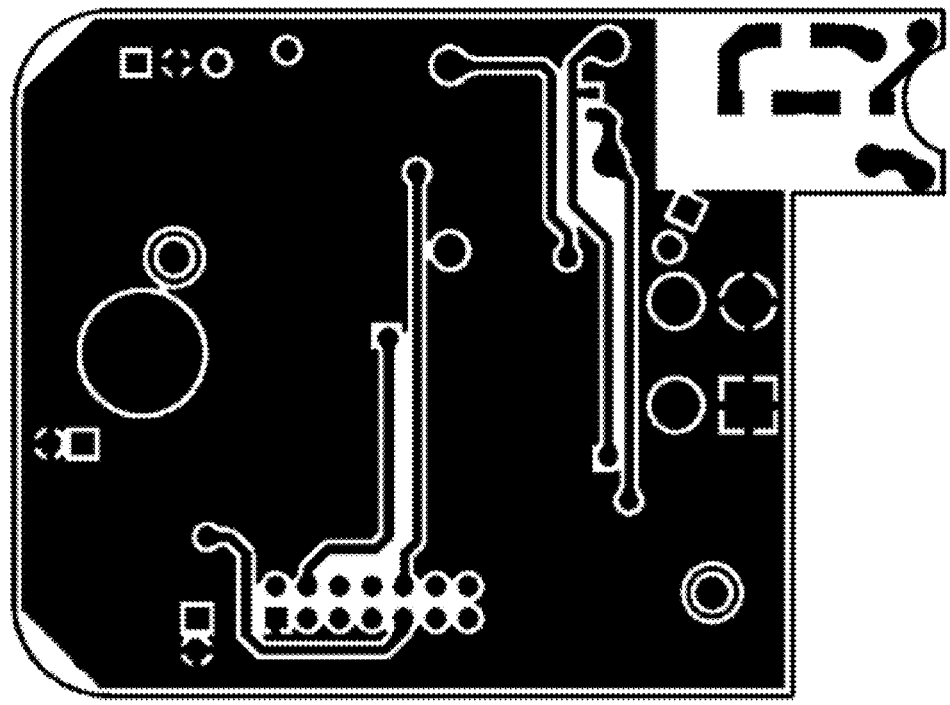

FIG. 32
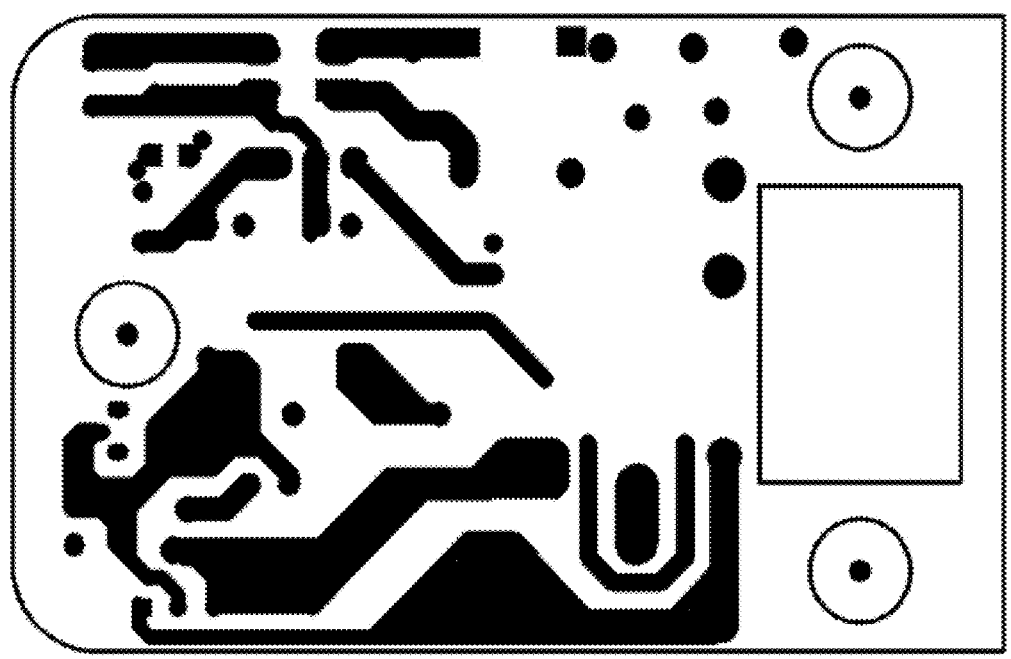
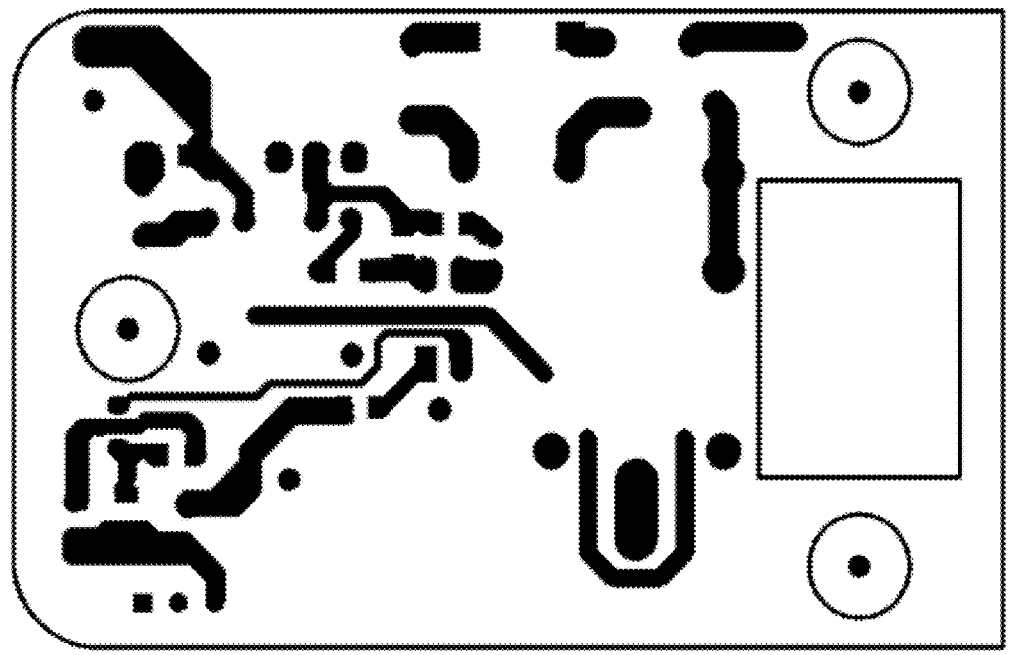

BATTERY CHARGER MANAGEMENT SYSTEM AND METHOD FOR CONTROLLING A CHARGE CURRENT BY INDIRECTLY DETERMINING THE TYPE AND CHARACTERISTICS OF A BATTERY VIA A CURRENT CONSUMED BY A CHARGER

CROSS REFERENCE TO RELATED APPLICATIONS

Continuation-in-Part Applications

This application is a Continuation-In-Part (CIP) of U.S. Utility Patent Application for BATTERY MANAGEMENT SYSTEM AND METHOD by Jin (nmn) Lu, Todd Scott Kelly, and Lee (nmn) Cheung, filed electronically with the USPTO on Oct. 4, 2012, with Ser. No. 13/644,995.

This application claims benefit under 35 U.S.C. §120 and incorporates by reference U.S. Utility Patent Application for BATTERY MANAGEMENT SYSTEM AND METHOD by Jin (nmn) Lu, Todd Scott Kelly, and Lee (nmn) Cheung, filed electronically with the USPTO on Oct. 4, 2012, with Ser. No. 13/644,995. This document and its parent Provisional Patent Application (Ser. No. 61/542,811, and Ser. No. 61/655,099) will be collectively referred to herein as "DOCUMENT BMSM".

U.S. Utility Patent Applications

This application claims benefit under 35 U.S.C. §120 and incorporates by reference United States Utility Patent Application for DATA SERVER SYSTEM AND METHOD by inventors Jin (nmn) Lu and Todd Scott Kelly, filed electronically with the USPTO on Oct. 4, 2012, with Ser. No. 13/645,080.

This application claims benefit under 35 U.S.C. §120 and incorporates by reference United States Utility Patent Application for NETWORK INTEGRATION SYSTEM AND METHOD by inventors Jin (nmn) Lu and Todd Scott Kelly, filed electronically with the USPTO on Oct. 4, 2012, with Ser. No. 13/645,044.

This application claims benefit under 35 U.S.C. §120 and incorporates by reference United States Utility Patent Application for BATTERY MANAGEMENT SYSTEM AND METHOD by Jin (nmn) Lu, Todd Scott Kelly, and Lee (nmn) Cheung, filed electronically with the USPTO on Oct. 4, 2012, with Ser. No. 13/644,995.

This application claims benefit under 35 U.S.C. §120 and incorporates by reference United States Utility Patent Application for POWER CONTROL SYSTEM AND METHOD by inventors Jin (nmn) Lu, Todd Scott Kelly, and Lee (nmn) Cheung, filed electronically with the USPTO on Oct. 4, 2012, with Ser. No. 13/644,795.

PCT Patent Applications

This application claims benefit under 35 U.S.C. §120 and incorporates by reference PCT Patent Application for DATA SERVER SYSTEM AND METHOD by inventors Jin (nmn) Lu and Todd Scott Kelly, filed electronically with the USPTO on Oct. 4, 2012, with serial number PCT/US12/58788.

This application claims benefit under 35 U.S.C. §120 and incorporates by reference PCT Patent Application for NETWORK INTEGRATION SYSTEM AND METHOD by inventors Jin (nmn) Lu and Todd Scott Kelly, filed electronically with the USPTO on Oct. 4, 2012, with serial number PCT/US12/58781.

This application claims benefit under 35 U.S.C. §120 and incorporates by reference PCT Patent Application for BATTERY MANAGEMENT SYSTEM AND METHOD by Jin (nmn) Lu, Todd Scott Kelly, and Lee (nmn) Cheung, filed electronically with the USPTO on Oct. 4, 2012, with serial number PCT/US12/58771.

This application claims benefit under 35 U.S.C. §120 and incorporates by reference PCT Patent Application for POWER CONTROL SYSTEM AND METHOD by inventors Jin (nmn) Lu, Todd Scott Kelly, and Lee (nmn) Cheung, filed electronically with the USPTO on Oct. 4, 2012, with serial number PCT/US12/53761.

U.S. Provisional Patent Applications

This application claims benefit under 35 U.S.C. §119 and incorporates by reference United States Provisional Patent Application for DATA SERVER SYSTEM AND METHOD by inventors Jin (nmn) Lu and Todd Scott Kelly, filed electronically with the USPTO on Sep. 7, 2012, with Ser. No. 61/698,288.

This application claims benefit under 35 U.S.C. §119 and incorporates by reference United States Provisional Patent Application for NETWORK INTEGRATION SYSTEM AND METHOD by inventors Jin (nmn) Lu and Todd Scott Kelly, filed electronically with the USPTO on Jul. 3, 2012, with Ser. No. 61/667,477.

This application claims benefit under 35 U.S.C. §119 and incorporates by reference United States Provisional Patent Application for POWER CONTROL SYSTEM AND METHOD by inventors Jin (nmn) Lu, Todd Scott Kelly, and Lee (nmn) Cheung, filed electronically with the USPTO on Jun. 18, 2012, with Ser. No. 61/661,100.

This application claims benefit under 35 U.S.C. §119 and incorporates by reference United States Provisional Patent Application for BATTERY MANAGEMENT SYSTEM AND METHOD by Jin (nmn) Lu, Todd Scott Kelly, and Lee (nmn) Cheung, filed electronically with the USPTO on Jun. 4, 2012, with Ser. No. 61/655,099.

This application claims benefit under 35 U.S.C. §119 and incorporates by reference United States Provisional Patent Application for SMART BATTERY CONTROLLER by inventor Jin (nmn) Lu, filed electronically with the USPTO on Oct. 4, 2011, with Ser. No. 61/542,811.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO MICROFICHE APPENDIX

Not Applicable

FIELD OF THE INVENTION

The present invention generally relates to systems and methods for the controlled charging and discharging of batteries. Specifically, the present invention attempts to automate and control the charge/discharge cycles of batteries to optimize battery lifespan under a wide variety of power demand and environmental use conditions.

PRIOR ART AND BACKGROUND OF THE INVENTION

Prior Art Background

Rechargeable batteries (especially lithium ion batteries) are generally considered the future of mobile PC, cell phones, and many other portable consumer devices. Their sales are anticipated to grow exponentially to meet the portable power demands of these products. The active lifespan of rechargeable batteries has a direct impact on the cost to consumers of these products, the energy consumed to recharge these devices, and significantly impacts the environment as these batteries end their life cycle and are discarded. If used properly, a typical battery can last 3-5 years or more. However, a battery can only last half of that time if improperly used. Prolonging the lifespan of rechargeable batteries through new methods and technologies may therefore translate into billions of dollars saved for consumers and a reduction in the environmental impact of these energy storage devices.

Battery Characteristics

It is known that all rechargeable batteries suffer from the following problems:
- Full charges or under charges of batteries shorten the life span (or cycle life) of the batteries. This effect is more serious for multi-cell batteries, which are widely used today.
- Batteries need to be charged and discharged (used) frequently—they are designed to be used.
- High temperature reduces the life span of the batteries.
- A battery calibration is needed every 2-3 months to keep the battery level monitoring system accurate.
- For some battery types, a recondition cycle is required every 2-3 months to remove the so called "memory effect" (batteries "remember" how much discharge was required on previous discharges and would only accept that amount of charge in subsequent charges).

As a result of these shortcomings, a rechargeable battery can become unusable well before the designed life span (typically half the designed life span of 5 years) due to improper charging and discharging. This means users must spend more to buy the rechargeable batteries. Additionally, when a battery ages fast due to charging and discharging improperly, significant energy is wasted. Here are a few reasons why energy is wasted when aging batteries are used:
- When a battery starts to age, its internal resistance increases to up to 200% of its original value. This implies more energy is turning into heat either when the battery is used (discharged) or when it is charged.
- When battery ages, self-discharge increases (to 10-20%), meaning energy is "dissipated" for no useful purposes.
- When fully charged, the battery chemical reaction increases and internal resistance increases even more, turning energy into wasted heat.
- As the battery ages, the internal capacity decreases (no longer holds enough energy), and the energy used to charge the battery is turned into reduced stored energy, another form of wasted energy.
- When the energy becomes heat, which increases the chemical reactions inside the battery, the situations mentioned above become even worse.

For example, a High Capacity Lithium Battery (HP Laptop Battery H12h) has a rated capacity of 10.8 Volt with 8800 mAh=8.8 Ah. This means that if the PC application draws 1 A, it will last 8.8 hours. A typical battery has 300 m ohm to 1 ohm internal resistance. Considering the wasted energy resulting from internal resistance and aging, when the internal resistance increases to 2 ohm, the power wasted on the internal resistance is about 2 W. If more current is drawn, the wasted energy is even more. As an example, considering a self-discharging rate of 10% this equates to another 2 W (10.8V×2 A/10). Charging the battery will require about 11 W (10.8V×1 A). If the charging does not produce expected battery capacity due to aging, then the charging energy is wasted. Assuming that half of the charging energy is wasted, it is not producing the expected energy charge for the battery. Without considered all the energy wasting factors, the wasted energy in this case for an aging battery is 4 W during discharge and 5 W during charging. In reality, the wasted energy is actually higher. Considering the number of hours people use battery-driven devices and the number of such devices, the overall energy waste associated with battery charging factored in a global scale is quite large.

To address the issues, many discussions can be found within the prior art about how to prolong the life of rechargeable batteries. Consumers can extend the lifespan of their rechargeable batteries by following some of the best practices, manually controlling the timing of changing/discharging the batteries, calibrate the battery monitoring system, reconditioning the battery from time to time, etc. However, all of these techniques require a disciplined, consistent practice over a long time. This is a tedious if not impossible job for most users of rechargeable batteries.

Prior Art System Overview (0100)

Within the prior art of battery charger management as applied to portable computers, as generally illustrated in FIG. 1 (0100), the prior art generally teaches that a portable computing device (or other portable battery-powered device) (0110) typically comprises the computing device (0101) running software read from a computer readable medium (0102), a battery (0103), battery charger (0104), and wall transformer (0105) having an AC plug (0106) for connection to a power source (0107). Within this context the computing device (0101) running under software control (0102) may incorporate a graphical user interface (GUI) (0109) to support operator (0109) interaction.

This configuration may integrate the wall outlet power adapter (0105) and AC power connection (0106) in a single "wall transformer" module and typically integrates the battery (0103) and battery charger (0104) electronics within the computing device enclosure (0110). However, some configurations place the battery charging circuitry (0104) within the wall outlet power adapter (0105) housing and simply supply charging current to the battery (0103) contained within the computing device enclosure (0110). Software (0102) operating on the computing device hardware (0101) may modulate the computing device performance based on detected battery capacity, charge level, and other operator (0109) defined parameters.

Prior Art Method Overview (0200)

As generally seen in the flowchart of FIG. 2 (0200), prior art methods associated with battery charging methodologies may be generally described in terms of the following steps:
(1) Measuring the battery voltage (0201);
(2) Determining if the battery voltage is less than nominal, and if so, proceeding to step (4) (0202);
(3) Initiating a trickle charge or "top off charging" of the battery and proceeding to step (1) (0203);
(4) Enabling a rapid battery charge (0204); and
(5) If the battery charge cycle is complete, proceeding to step (1), otherwise proceeding to step (5) (0205).

This prior art method generally on the current battery voltage when determining what charging actions to take with respect to the battery. This method lacks integration of historical battery information in the battery charge cycle.

Deficiencies in the Prior Art

The prior art as detailed above suffers from the following deficiencies:
- Prior art battery charging systems/methods have as their goal the "full charging" of the battery in portable computer equipment, even though this goal results in reduced overall battery life.
- Prior art battery charging systems/methods generally do not compensate for environmental battery conditions.
- Prior art battery charging systems/methods generally do not regulate battery charge/discharge cycles independently.
- Prior art battery charging systems/methods generally do not automatically compensate for use characteristics of the portable computer equipment.
- Prior art battery charging systems/methods cannot be updated to accommodate a variety of battery types and chemistries.
- Prior art battery charging systems/methods do not perform battery calibration tests to dynamically determine the best charge/discharge profiles for the current state of the battery.
- Prior art battery charging systems/methods do not permit automatic battery lifecycle optimization to be retrofit into existing battery powered computing devices.

While some of the prior art may teach some solutions to several of these problems, the core issue of optimizing battery lifespan within a wide variety of portable battery powered computer equipment has not been addressed by the prior art.

Objectives of the Invention

Accordingly, the objectives of the present invention are (among others) to circumvent the deficiencies in the prior art and affect the following objectives:
(1) Provide for a battery charger management system and method that permits rechargeable battery life to be increased as compared to the prior art charging systems.
(2) Provide for a battery charger management system and method that permits enhanced battery lifespans to be achieved without modification of the charging device hardware.
(3) Provide for a battery charger management system and method that permits charge/discharge cycles to be adapted to battery chemistry.
(4) Provide for a battery charger management system and method that permits wireless control of battery charging/discharge cycles.
(5) Provide for a battery charger management system and method that permits battery charging and calibration cycles to be performed automatically and without user intervention to optimize battery lifespan.
(6) Provide for a battery charger management system and method that permits battery charge/discharge cycles to be optimized in terms of environmental conditions.
(7) Provide for a battery charger management system and method that decreases battery material waste by improving battery lifespan.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

System Overview (0300)

The present invention in various embodiments addresses one or more of the above objectives in the following manner. The present invention works in conjunction with traditional standalone and integrated battery charging systems to automate the optimization of battery charging and battery longevity.

A traditional battery charging system monitors the current (power) supplied to the battery under charge and modulates the charge current/voltage based on observed battery behavior. This generally requires some form of monitoring of the actual battery voltage/current as it undergoes charge. As generally illustrated in FIG. 3 (0300), the present BCMD invention (0310) differs from this approach in that it controls (0311) and monitors (0312) the current profile of the BATTERY CHARGER (0330), and indirectly deduces the battery (0340) type, characteristics, and charge state by normalizing the current profile measured in terms of the BATTERY CHARGER (0330) and not the battery (0340). Since the current consumed by the battery under charge will be indirectly impacting the battery charger current profile, measured battery charger current draw will be impacted by the battery charge state and other characteristics.

Once the present invention has deduced the battery (0340) type, characteristics, and charge state indirectly from the battery charger (0330) current profile (by matching the normalized battery charger current profile to known battery types and characteristics), it can then select from a set of known battery charge profiles to execute. These battery charge profiles are then executed by modulating the state of an electrical switch (within the PSCU (0311)) supplying power to the battery charger. Thus, the battery charger (0330) is turned ON/OFF for durations which correspond to the battery charge profile optimally selected for the detected battery type, characteristics, and charge type.

Method Overview (0400)

The present invention system may be utilized in the context of an overall battery charger management method, wherein the battery charger management system described previously is controlled by a method having the following steps:

(1) measuring the current consumed by a battery charger power supply (BOPS) supplying current to a battery under charge (BUC) to produce a measured current profile (MCP) (0401);

(2) calculating a normalized current profile (NCP) from the MCP as the initial charge profile the BUC (0402);

(3) optionally matching the NCP to a database (0410) of known battery types and characteristics (if the database is not available then the NCP will be used to determine the charge profile) (0403);

(4) optionally determining a charge profile for the BUC based on the database match (if the database is not available then the NCP will be used to determine the charge profile) (0404); and (5) executing the charge profile for the BUC by modulating the activation of an electrical switch supplying power to the BCPS (0405).

Integration of this and other preferred exemplary embodiment methods in conjunction with a variety of preferred exemplary embodiment systems described herein is anticipated by the overall scope of the present invention.

BRIEF DESCRIPTION OF THE DRAWINGS

For a fuller understanding of the advantages provided by the invention, reference should be made to the following detailed description together with the accompanying drawings wherein:

FIG. 30 illustrates an exemplary primary printed circuit board (PCB) top/bottom layout for an exemplary invention embodiment;

FIG. 32 illustrates an exemplary secondary printed circuit board (PCB) top/bottom layout for an exemplary invention embodiment.

DESCRIPTION OF THE PRESENTLY PREFERRED EXEMPLARY EMBODIMENTS

Figure 1:
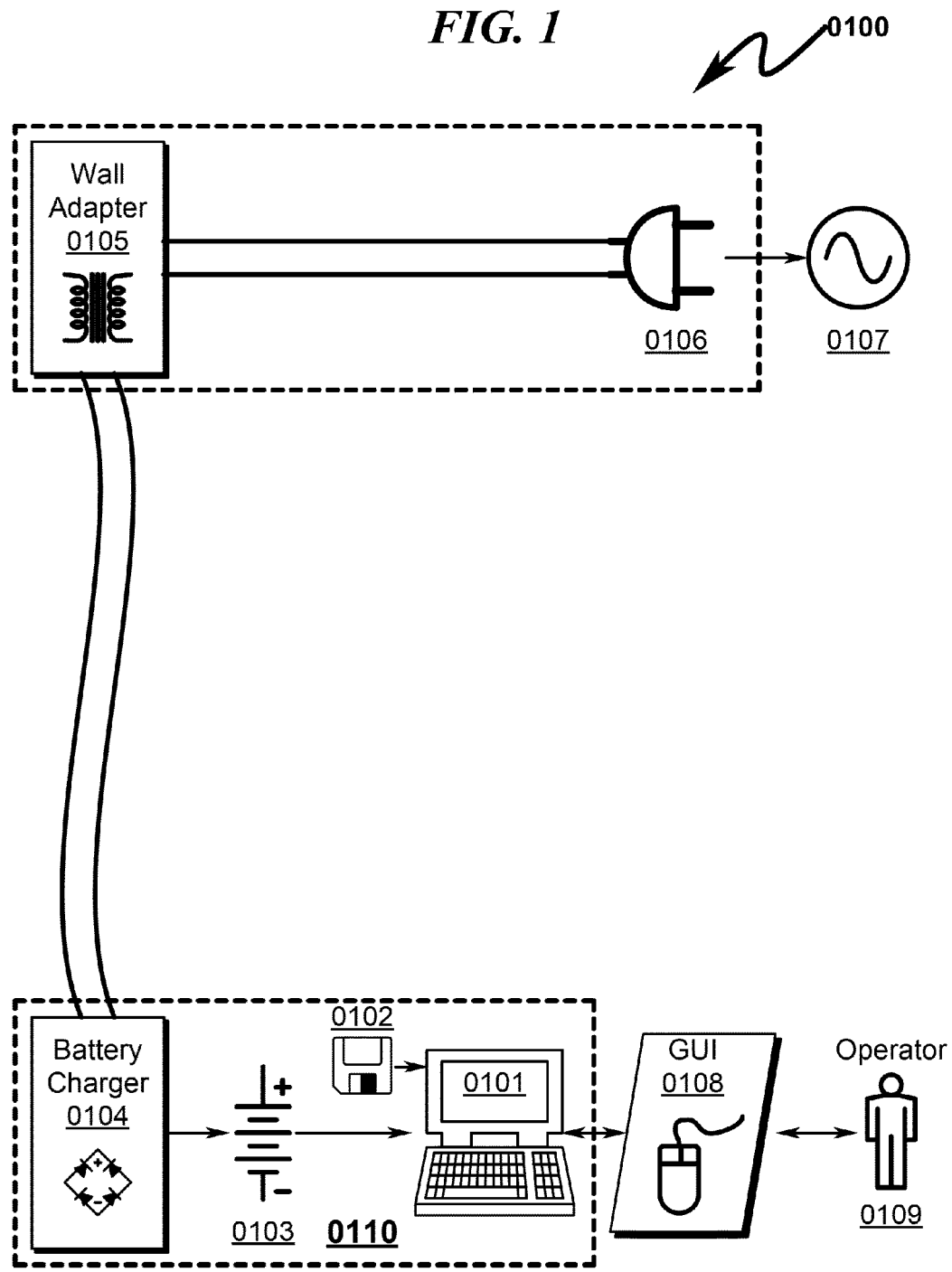
FIG. 1 illustrates a system diagram describing a prior art system context for battery powered computing devices.
Figure 2:
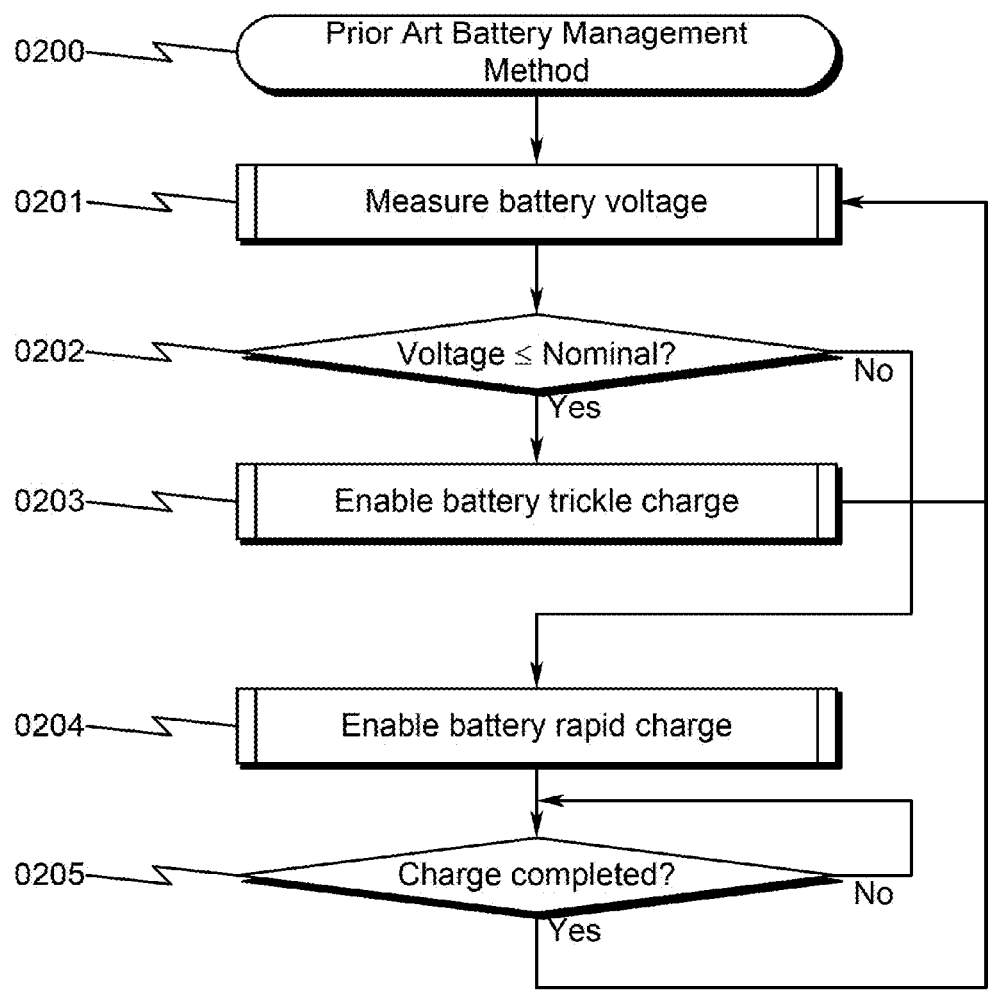
FIG. 2 illustrates a method flowchart describing how prior art systems approach battery charging for battery powered computing devices.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a BATTERY CHARGER MANAGEMENT SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Battery Not Limitive

The present invention anticipates a wide variety of batteries and battery chemistries may be managed by the battery charger management described herein. Within this context, many preferred system embodiments will utilize lithium-ion batteries. However, the present invention makes no limitation on the specific type of battery and/or battery chemistry that may be adapted using the present invention teachings.

Current Detection Not Limitive

The present invention anticipates that current and/or power monitoring of BCPS devices may be used to profile the current consumption of the battery under charge (BUC). While the discussion herein will focus on current detection (as it is deemed optimal in many preferred embodiments), the invention scope covers both current and/or power monitoring of the BCPS.

BCMD Invention Architecture

The present invention incorporates a control system that automates the best practices in prolonging the lifespan of rechargeable batteries in the context of application to conventional battery chargers. This control system is generally termed a "Battery Charger Management Device (BOND)" and may be embodied using a variety of battery charger management systems and/or methods as described herein. To address the battery life "shortening" effects listed previously, the BCMD when implemented using a Smart Gateway Power Controller (SGPC) for equivalent hardware) monitors battery charging profiles, keeps track of consumer use profiles, and provides the following features:

Has knowledge of the optimal battery charge level and discharge level based on the type and age of the battery, and charges and discharges automatically and frequently to these optimal or operator-set levels.

Provides an easy-to-use mobile user interface for operators to set the charge and recharge limits for various battery chargers controlled by the BCMD.

Monitors the temperature and halts the charge cycle during periods of high ambient temperature.

One skilled in the art will recognize that these features may or may not be implemented in each invention embodiment and serve only to describe characteristics of some preferred embodiments.

Introduction

Contrast to Parent Application Methodology

The BCMD device is an extension to the battery management system described in DOCUMENT BMSM. The system described in the DOCUMENT BMSM reference assumes that the battery charger such as the laptop charger and cell phone charger have a way to notify the battery charger controller of battery capacity so that the battery management system can control the battery charger. The notification can be accomplished in the BMSM reference through wireless communications, for example, the WiFi communication between the battery management system and the device (e.g. laptop, smart phone, etc.) that hosts the battery charger.

The BCMD described in the present invention removes that assumption, and can be applied to any battery charger, including those mentioned in this previous application. Thus, the present invention teaches the following:

how a BCMD monitors the status of the charger and the battery capacity based on the measurements of the electric current input to the charger that flows through the BCMD; and how the BCMD controls the battery charger based on the monitored information.

The BCMD shares the same user interface and some of the control methods as those the BMSM, however the method by which the BCMD determines the battery characteristics and charging state differ from that used by the BMSM.

Target Application

As rechargeable batteries see more and more usages in recent years in consumer electronic devices, vehicles, instruments and equipment, there is a need to manage the process of charging rechargeable batteries so that the batteries can last longer, energy is used more efficiently in charging the batteries, and the users can more easily monitor and control the charging process. The BCMD as described herein is introduced to address these issues and solve the following problems:

Monitor the battery charging process. Many commercial battery chargers do not have a user-friendly way to inform the users the battery charging process in terms of the start and stop of process, how long it takes for a charge, and the energy consumed in the charging process, among other things. This information is both useful and convenient to consumers. For example, consumers can see the status (done, in process, etc.) of charging and the remaining charging time on their smart phones from anywhere.

Schedule the start and stop of battery charging. Sometimes it is necessary to schedule the start of the battery charging as when the energy cost is low during the day. It is also necessary to turn off the charger to cut off the trickle current that flows into a battery when it is fully charged. The trickle current is damaging to the life span of a rechargeable battery. Cutting off the trickle current also saves energy, which may count for up to 10% of the energy needed for fully changing the battery. In addition, it is known that for some types of batteries such as Lithium Ion ones, it is better to stop charging when the battery level reaches 80-90% for the longevity of the battery. Few chargers provide such flexibility for consumers to stop the charging before the battery is 100% charged.

A BCMD is not a replacement for a battery charger but rather it is a cost-effective enhancement to most commercial battery chargers. In this context a BCMD provides complementary management functions many users will find convenient and valuable.

General BCMD Embodiments

Figure 7:
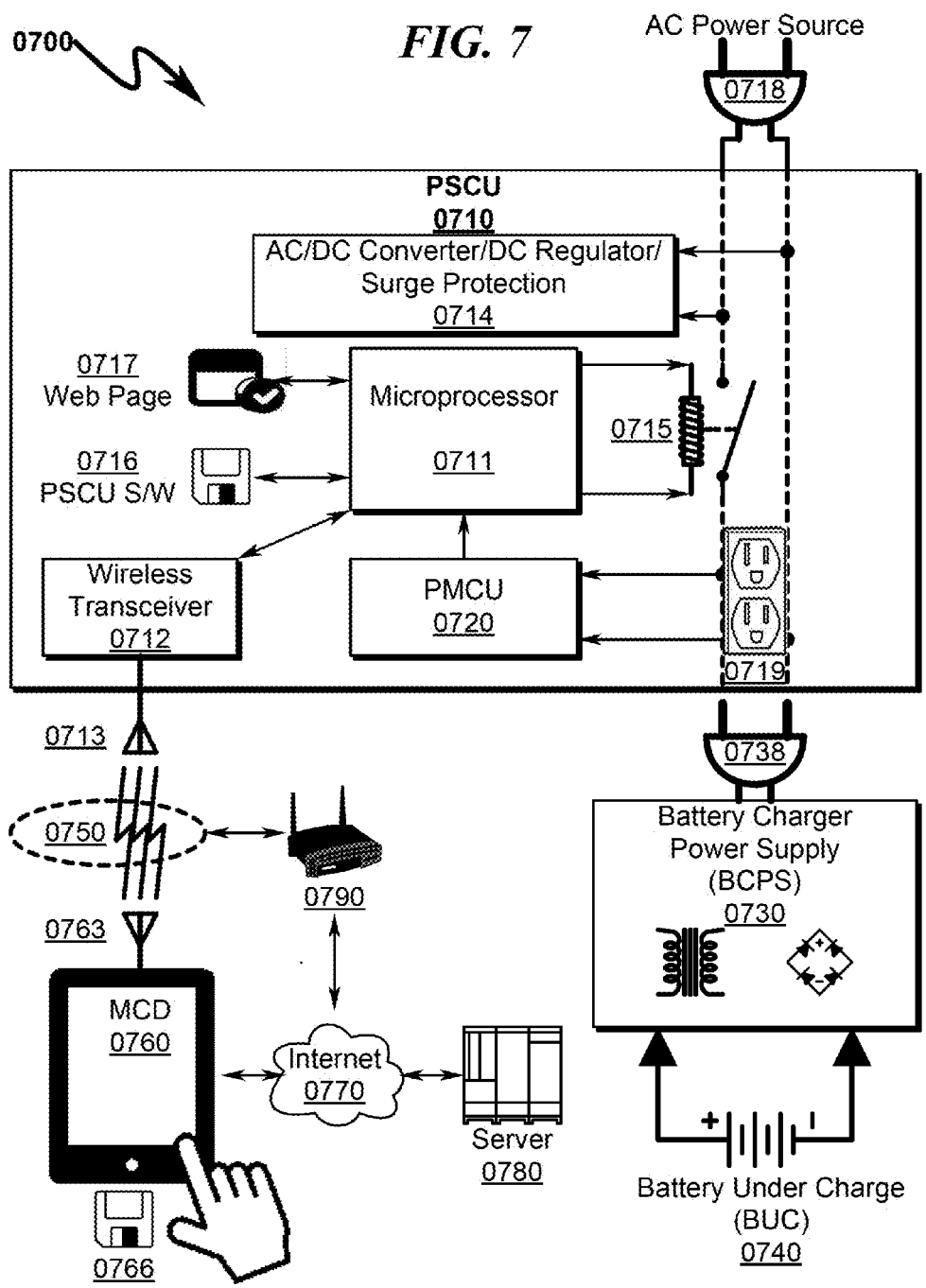
FIG. 7 illustrates an exemplary system block diagram of a preferred exemplary standalone system embodiment of the present invention.
Figure 8:
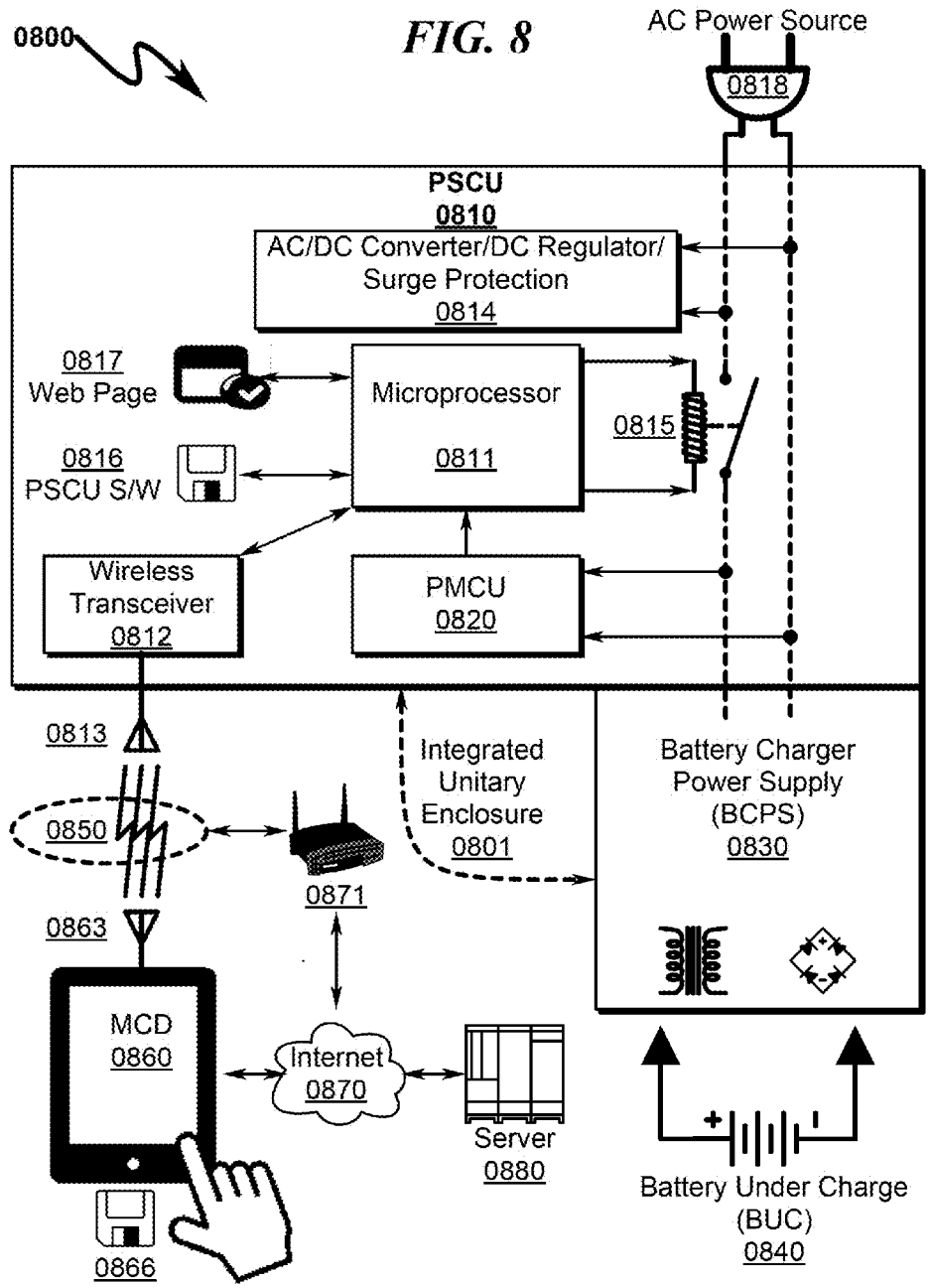
FIG. 8 illustrates an exemplary system block diagram of a preferred exemplary integrated system embodiment of the present invention.

A BCMD may generally be embodied in one of two forms:
- a standalone form which plugs into wall power outlet and provides a standard line power simple/duplex power plug socket to supply power to a battery charger incorporating a standard power plug (as generally illustrated in the block diagram of FIG. 7 (0700); and
- an integrated form in which the BCMD is embedded in a unitary enclosure with battery charger (as generally illustrated in the block diagram of FIG. 8 (0800).

The present invention as described herein will concentrate on the standalone form, but it should be understood that these teachings may be equally applied to the inclusion of the BCMD as a "front-end" to a traditional battery charger wherein the BCMD and battery charger are integrated within a unitary enclosure. A person of ordinary skill in battery charger design should be able to easily integrate the invention teachings discussed herein into any conventional battery charger.

General Construction and Power Flow

As generally illustrated in FIG. 7 (0700) and FIG. 8 (0800), a typical BCMD embodiment incorporates a 3-prone or 2-prone plug (0718, 0818) that goes into a wall power outlet, and contains a 3-prone or 2-prone socket (0719) for a battery charger to plug into (0738).

As illustrated in FIG. 7 (0700) and FIG. 8 (0800), a typical BCMD embodiment contains a circuit switch (0715, 0815) that can turn off the power supply to the battery charger (0730, 0830), and a power measurement unit (0720, 0820) that measures the current or the power drawn by the battery charger (0730, 0830). It also contains a microcontroller (0711, 0811) and a wireless module (0712, 0812) (e.g. a WiFi module) that communicates with a wireless base station (e.g., WiFi access point (AP)). The microcontroller (0711, 0811) controls the switch (0715, 0815), reads the current or power measurement (0720, 0820), and interacts with users through the wireless module (0712, 0812). Through the wireless communication (0712, 0812), the microcontroller (0711, 0811) receives from users the charger management commands and executes them. The microcontroller (0711, 0811) also sends information about the battery charger status and the battery capacity back to a user device the microcontroller (0760, 0860) (e.g., smart phone or other computing device).

FIG. 7 (0700) generally illustrates how an exemplary BCMD is used in standalone mode. Users plug in any charger to a BCMD (0710), turn on the battery charger (0730), and put on the rechargeable battery on the charger. The BCMD can then turn on and off (0715) the battery charger (0730) and monitor the charging process from a remote device (0760).

Exemplary Use Cases

While a variety of application use cases for the present invention are anticipated, several application contexts are preferred. These include but are not limited to the following:
- Connect to a BCMD: connect to the WiFi module of a BCMD with a smart phone (just like connecting to any WiFi device), open the web page hosted on the BCMD or connect to a known URL where a central web server interacts with multiple BCMDs.
- Monitor the BCMD: on the web page described above, users can see the charging process in terms of battery capacity, the remaining charge time, etc.
- Schedule the charging process: on the same web page described above, users can set schedules for starting/stopping the battery charging.

Within these general application contexts, a BCMD fulfills the following functions:
- It measures the power consumption (in terms of current and/or power) of the battery charger and based on this information it determines the status of the battery charger (done, in process, off, etc.). Users are permitted to obtain status on whether a battery is bad by looking at the battery power consumption profile (discussed later).
- It starts and stops the charger by turning on and off the electrical switch supplying power to the battery charger based on user configuration parameters.
- It provides a user interface (e.g., a web server embedded in the BCMD) for users to remotely monitor and control the battery charging process.

Before discussing the details of these functions, some introduction on the basic system overview and relevant facts relating battery chargers and rechargeable batteries will be presented.

System Overview (0300)

Figure 3:
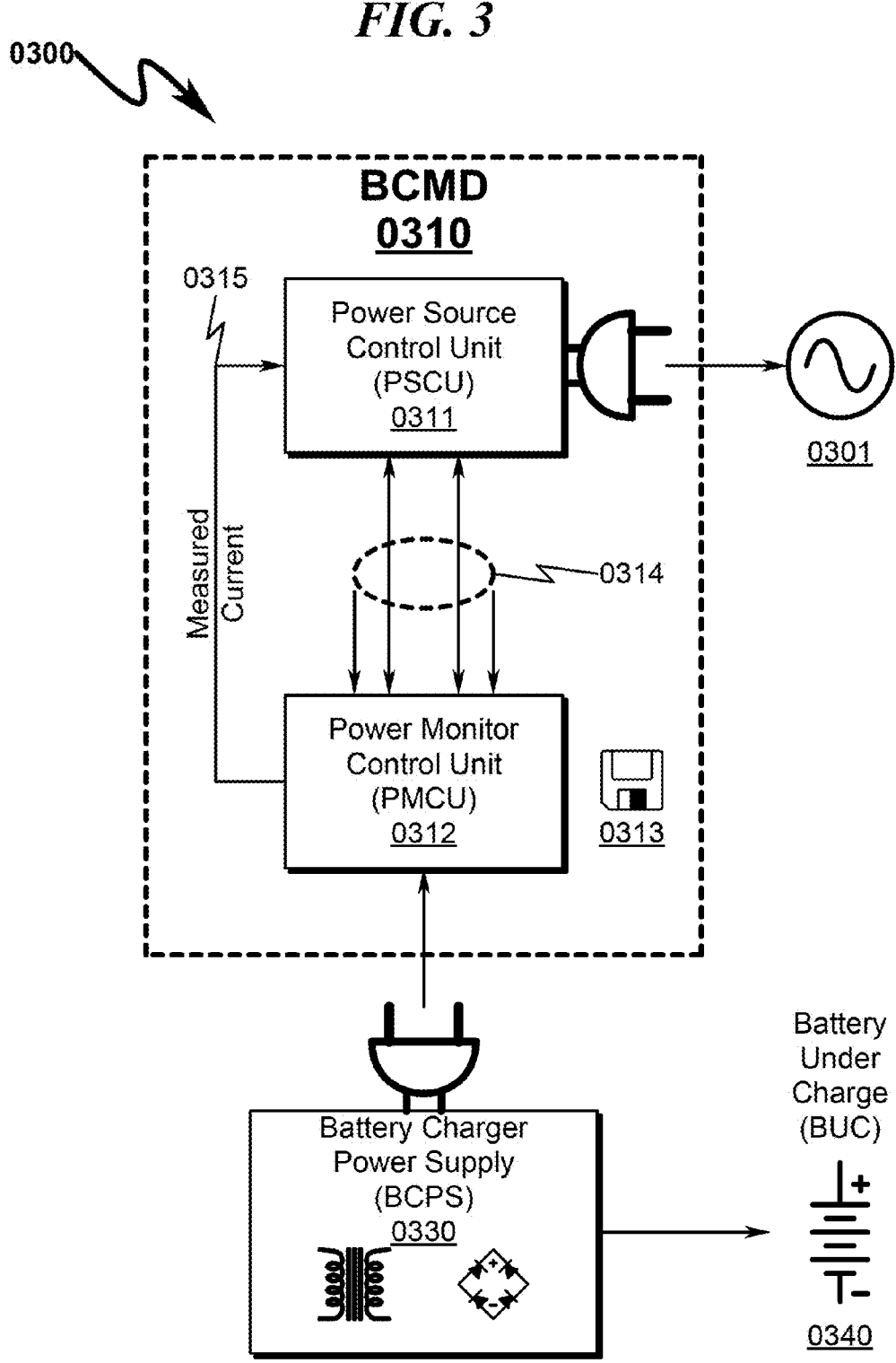
FIG. 3 illustrates a system block overview diagram describing a presently preferred embodiment of the present invention.

The present invention may be seen in an overview system context as generally illustrated in FIG. 3 (0300), wherein the present invention battery charger management system (BCMS) (0310) incorporating a power source control unit (PSCU) (0311) and a Power Monitor Control Unit (PMCU) (0312) is interfaced to a battery charger (0330) responsible for supplying current to a battery under charge (BUC) (0340). The battery charger (0330) may take many forms, from a conventional wall plug power adapter to an integrated power supply within a computing device such as a laptop, tablet computer, personal computer, smartphone, cellphone, or other mobile device.

The BCMS (0310) as illustrated may incorporate software (0313) read from a computer readable medium and executed on a variety of computing devices incorporated into either the PSCU (0311) and/or PMCU (0312). The PSCU (0311) is responsible for switching power from the power source (typically AC line current) (0301) to the battery charger (0330). Additionally, the PMCU (0312) is responsible for measuring current (or power) supplied to the battery charger (0330) (typically with a current sensor (0314)) and reporting this measured current (or power) (0315) back to the PSCU (0311).

With this hardware configuration, the BCMS (0310) can control activation/deactivation of the battery charger (0330) based on measured power consumption of the battery charger (0330) (and indirectly the current consumed by the battery (0340) under charge). Since the current (power) consumed by the battery charger (0330) is in part determined by the charge current supplied to the battery (0340) (and determined in part by the charge state of the battery), the PSCU (0311) can monitor the PMCU (0312) measured current consumed by the battery charger (0330) and deduce the battery (0340) type, charge state, and optimal charging profile for the battery (0340) under charge.

Method Overview (0400)

The present invention system may be utilized in the context of an overall battery charger management method, wherein the battery charger management system described previously is controlled by a method having the following steps:

(1) measuring the current consumed by a battery charger power supply (BCPS) supplying current to a battery under charge (BUC) to produce a measured current profile (MCP) (0401);

(2) calculating a normalized current profile (NCP) from the MCP (0402 as the initial charge profile the BUC;

(3) optionally matching the NCP to a database (0410) of known battery types and characteristics (if the database is not available then the NCP will be used to determine the charge profile) (0403);

(4) optionally determining a charge profile for the BUC based on the database match (if the database is not available then the NCP will be used to determine the charge profile) (0404); and (5) executing the charge profile for the BUC by modulating the activation of an electrical switch supplying power to the BCPS (0405).

Integration of this and other preferred exemplary embodiment methods in conjunction with a variety of preferred exemplary embodiment systems described herein is anticipated by the overall scope of the present invention.

The calculation of the normalize current profile may take many forms, from simple scaling of the measured current (with corresponding attempts to match the scaled values to curves associated with various battery chemistries) to more advanced normalization that attempts to discern the operational state of the battery charger and then subtract this impact from the measured current values to leave a residual value associated with the battery alone. Within any of these methods there may be some intelligence provided to discern "bad" and/or failing battery behavior that permits warning messages to be provided to the user/operator. Thus, the system in some variation is capable of discerning conventional battery charging behavior as well as behavior dictating battery replacement or other operator intervention.

Alternate Preferred Embodiment System Block Diagram (0500)

Figure 5:
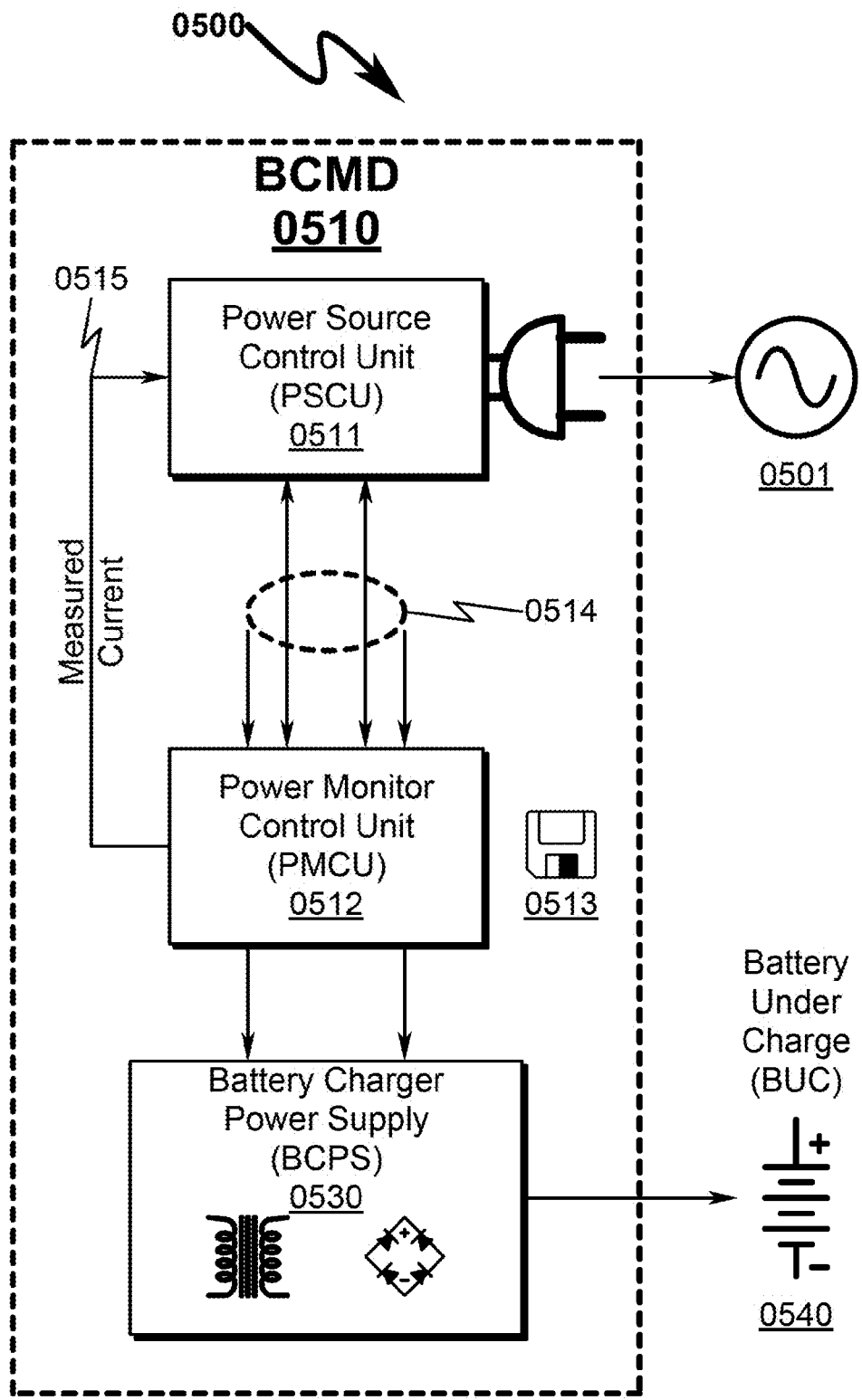
FIG. 5 illustrates an alternate system block diagram describing a presently preferred alternate embodiment of the present invention.

An alternate embodiment of the present invention may be seen in an overview system context as generally illustrated in FIG. 5 (0500), wherein the present invention battery charger management system (BCMS) (0510) incorporating a power source control unit (PSCU) (0511) and a Power Monitor Control Unit (PMCU) (0512) is interfaced to a battery charger (0530) responsible for supplying current to a battery under charge (BUC) (0540). The battery charger (0530) may take many forms, from a conventional wall plug power adapter to an integrated power supply within a electronic device such as a laptop, tablet computer, personal computer, smartphone, cellphone, or an electric vehicle.

The BCMS (0510) as illustrated may incorporate software (0513) read from a computer readable medium and executed on a variety of computing devices incorporated into either the PSCU (0511) and/or PMCU (0512). The PSCU (0511) is responsible for switching power from the power source (typically AC line current) (0501) to the battery charger (0530). Additionally, the PMCU (0512) is responsible for measuring current (or power) supplied to the battery charger (0530) (typically with a current sensor (0514)) and reporting this measured current (or power) (0515) back to the PSCU (0511).

With this hardware configuration, the BCMS (0510) can control activation/deactivation of the battery charger (0530) based on measured power consumption of the battery charger (0530) (and indirectly the current consumed by the battery (0540) under charge). Since the current (power) consumed by the battery charger (0530) is in part determined by the charge current supplied to the battery (0540) (and determined in part by the charge state of the battery), the PSCU (0511) can monitor the PMCU (0512) measured current consumed by the battery charger (0530) and deduce the battery (0540) type, charge state, and optimal charging profile for the battery (0540) under charge.

This configuration of the BCMD (0510) differs from that of the embodiment illustrated in FIG. 3 (0300) in that the BCPS (0530) is incorporated within the overall enclosure of the BCMD (0510) and therefore no external plug/socket is required for their interconnection. In this embodiment standardized battery chargers (0530) may be retrofitted with "smart" networked battery charger management without the need for redesign of the battery charger (0530) circuitry.

Preferred Exemplary Method Detail Embodiment (0600)

Figure 6:
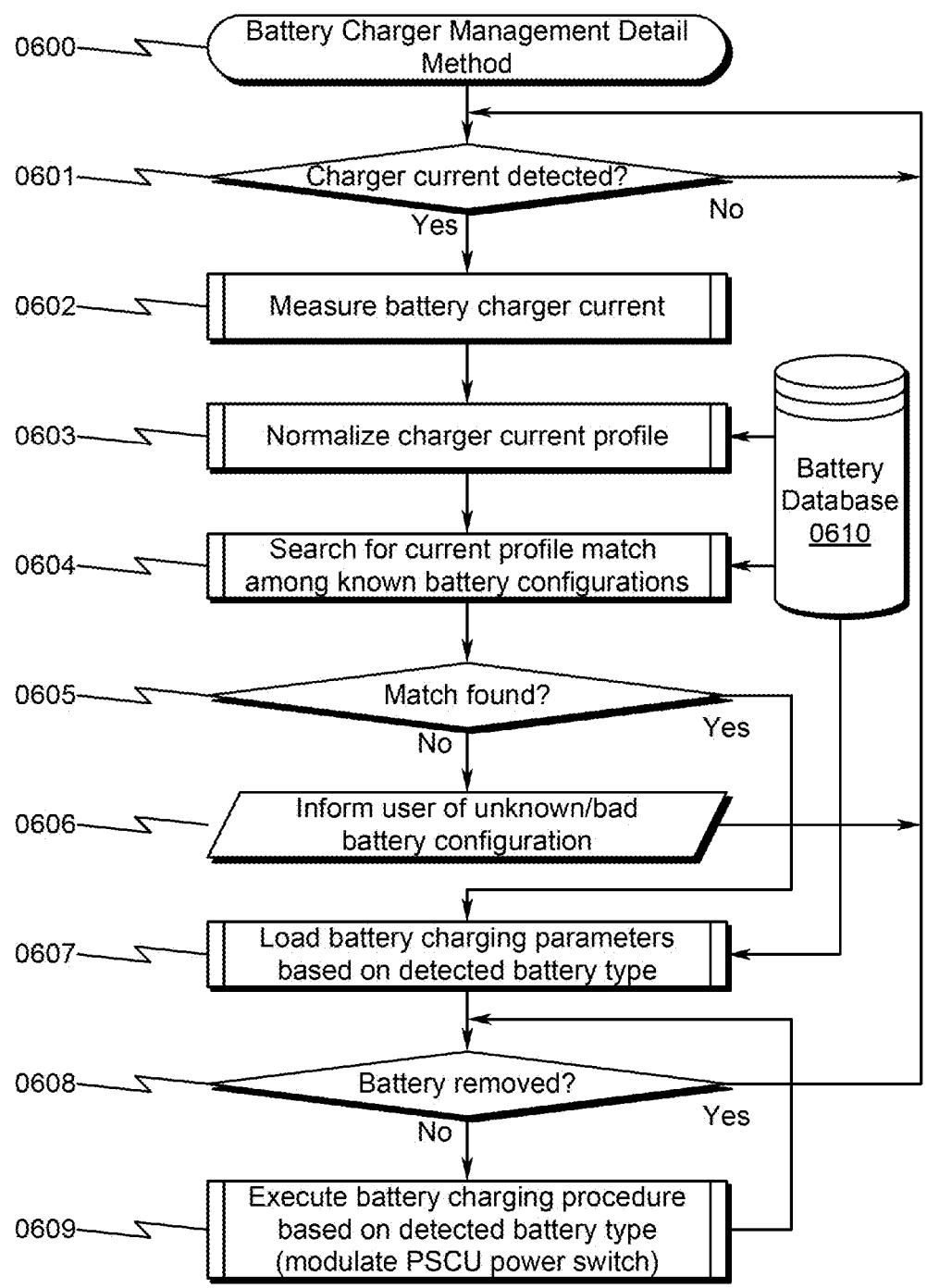
FIG. 6 illustrates an exemplary detail flowchart describing a presently preferred method embodiment of the present invention.

As generally seen in the detail flowchart of FIG. 6 (0600), the present invention method may be generally described in terms of the following steps:

(1) determining if the PMCU has detected BCPS current consumption, and if not, proceeding to step (1) (0601);

(2) generating a BCPS measured current profile (MCP) based on the measured current (0602);

(3) normalizing the MCP to produce a normalized measured current profile (NMCP) (0603);

(4) searching for a battery current profile match (BCPM) between the NMCP and known battery configurations or typical battery current characteristics to determine the type and charging characteristics of the BUC (0604);

(5) determining if a BCPM is found, and if so, proceeding to step (7) (0605);

(6) reporting an unknown or bad battery configuration then proceeding to step (1) (0606);

(7) determining battery charging parameters based on the BCPM (0607);

(8) determining if the BUG has been removed or disconnected from the BOPS, and if so, proceeding to step (1) (0608); and (9) executing a battery charging procedure based on the BCPM by modulating the activation of the EPS and proceeding to step (8) (0609).

One skilled in the art will recognize that these method steps may be augmented or rearranged without limiting the teachings of the present invention. This general method summary may be augmented by the various elements described herein to produce a wide variety of invention embodiments consistent with this overall design description.

Thus, it can be seen from this procedure that this battery charging methodology need not directly measure the power (or current) consumed by the battery in order to modulate the charge profile for the battery. Rather, the current consumed by the CHARGER is measured and then used to generate a normalized current profile match (NCPM) against a database of known battery types/characteristics. This normalization of charger current draw may have a significantly different characteristic as compared to that of the actual battery under charge, as the characteristics of each individual charger may vary (series regulators, current limited regulators, switching regulators, etc.).

Preferred Embodiment System Architecture (0700)

A preferred exemplary embodiment of the present invention showing interaction between the PSCU and the PMCU may be seen in more detail as generally illustrated in FIG. 7 (0700), wherein the PSCU (0710) and PMCU (0720) act in concert to support the battery charger management battery charger power supply (BCPS) (0730). Within this preferred context the PSCU (0710) incorporates microprocessor control (0711) in conjunction with a wireless transceiver (0712) and associated antenna (0713). Power to support these internal subsystems is obtained from an AC/DC converter/DC regulator/surge protection module (0714). This preferred configuration switches power from the AC power source using a relay (0715) or other switching means. This power switching (0715) results in enablement/disablement of power to the BCPS (0730) that supports charging of the battery (0740) in the portable device (not shown).

Modulation of the power switch (0715) state is accomplished by battery charger software read from a computer readable medium (0716) executing on the microprocessor (0711) that utilizes current measurement data obtained from the PMCU (0720) that monitors the charge profile of the BCPS (0730) and thus indirectly the current charge profile of the battery (0740).

The PSCU (0710) internal microprocessor (0711), wireless transceiver (0712), and associated antenna (0713) may be configured to communicate via a wireless communication link (0750) with a remote mobile communication device (MCD) (0750) (laptop, smartphone, cellular phone, tablet computer, personal computer, etc.) having its own antenna (0763). The MCD (0760) may be configured to execute software read from a computer readable medium (0766) and/or retrieve software (applications) from the Internet (0770) via a computer server (0780) and/or execute web content (0717) resident on the PSCU (0710). Within this context, the PSCU (0710) microprocessor (0711) may support web page content (0717) directly within the context of the PSCU (0710) and permit wireless access (0750) to this content via a wireless router (0790) connected to the Internet (0770). This network connectivity also permits the computer server (0780) access to web content (0717) and monitoring/control functions within the PSCU (0710).

As illustrated in this exemplary embodiment diagram, the PSCU (0710) is implemented in a standalone fashion and supports a simplex/duplex wall outlet (0719) into which the plug (0738) for the BCPS (0730) receives power switched (0715) under control of the PSCU (0710) microprocessor (0711).

Alternate Preferred Embodiment System Architecture (0800)

An alternate preferred exemplary embodiment of the present invention showing interaction between the PSCU and the PMCU may be seen in more detail as generally illustrated in FIG. 8 (0800), wherein the PSCU (0810) and PMCU (0820) act in concert to support the battery charger management battery charger power supply (BCPS) (0830). Within this preferred context the PSCU (0810) incorporates microprocessor control (0811) in conjunction with a wireless transceiver (0812) and associated antenna (0813). Power to support these internal subsystems is obtained from an AC/DC converter/DC regulator/surge protection module (0814). This preferred configuration switches power from the AC power source using a relay (0815) or other switching means. This power switching (0815) results in enablement/disablement of power to the BCPS (0830) that supports charging of the battery (0840) in the portable device (not shown).

Modulation of the power switch (0815) state is accomplished by battery charger software read from a computer readable medium (0816) executing on the microprocessor (0811) that utilizes current measurement data obtained from the PMCU (0820) that monitors the charge profile of the BCPS (0830) and thus indirectly the current charge profile of the battery (0840).

The PSCU (0810) internal microprocessor (0811), wireless transceiver (0812), and associated antenna (0813) may be configured to communicate via a wireless communication link (0850) with a remote mobile communication device (MCD) (0850) (laptop, smartphone, cellular phone, tablet computer, personal computer, etc.) having its own antenna (0863). The MCD (0860) may be configured to execute software read from a computer readable medium (0866) and/or retrieve software (applications) from the Internet (0870) via a computer server (0880) and/or execute web content (0817) resident on the PSCU (0810). Within this context, the PSCU (0810) microprocessor (0811) may support web page content (0817) directly within the context of the PSCU (0810) and permit wireless access (0850) to this content via a wireless router (0890) connected to the Internet (0870). This network connectivity also permits the computer server (0880) access to web content (0817) and monitoring/control functions within the PSCU (0810).

As illustrated in this exemplary embodiment diagram, the PSCU (0810) is combined with the BCPS (0830) in an integrated unitary enclosure (0801). This diagram illustrates the fact that any existing BCPS (0830) may be augmented with a "front-end" PSCU/PMCU combination to automate battery charging and permit remote access to the battery charger from mobile communication devices (MCDs) (0860) and/or the Internet (0870). The ability to support native web hosting (0817) within the context of the PSCU (0810) allows many existing BCPS (0830) designs that are not web-enabled to become so simply by "bolting-on" the PSCU (0810) front-end.

Preferred Examplary PSCU Block Diagram (0900)-(1400)

Figure 9:
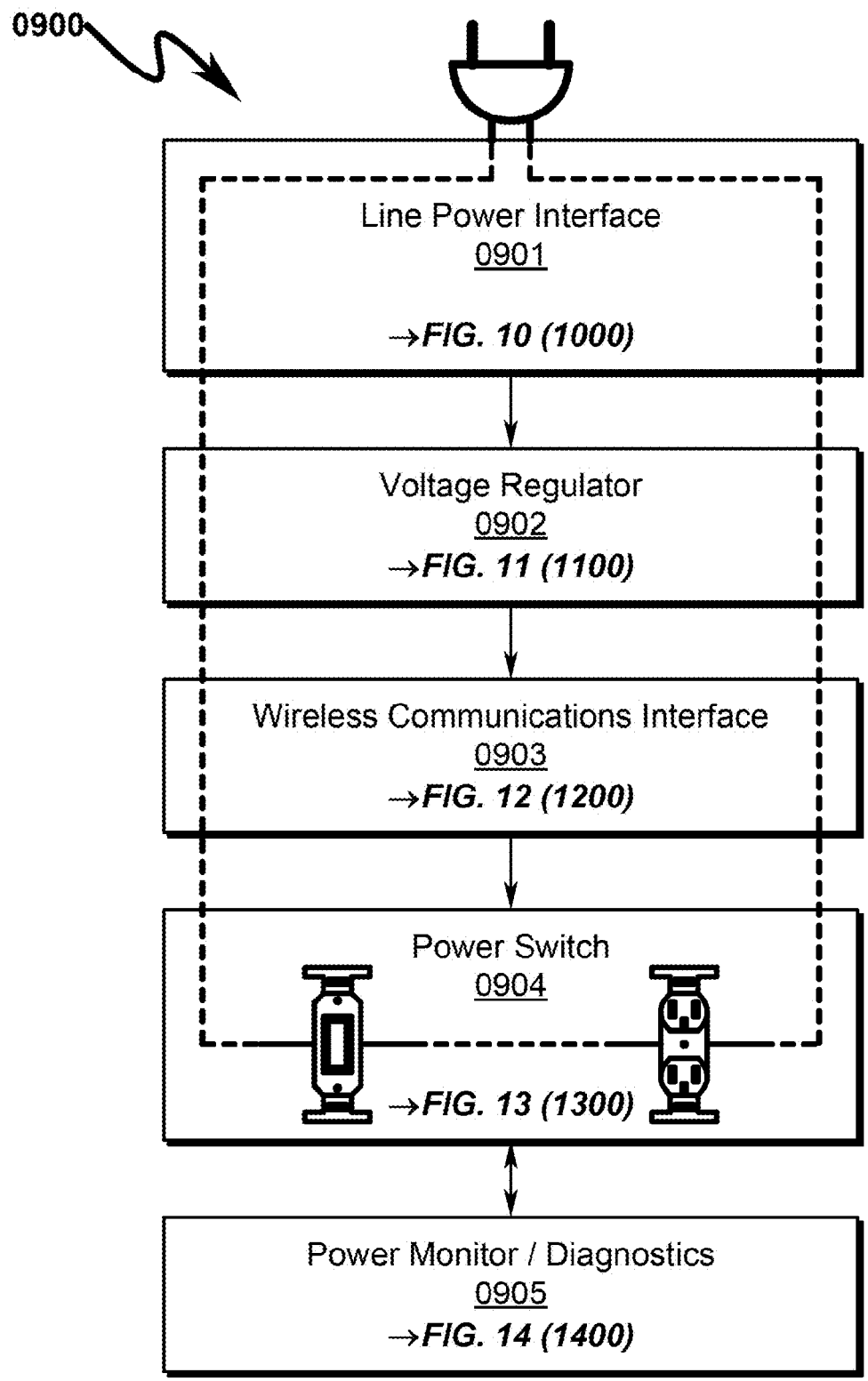
FIG. 9 illustrates an exemplary schematic block diagram of a preferred exemplary BCMS embodiment.
Figure 10:
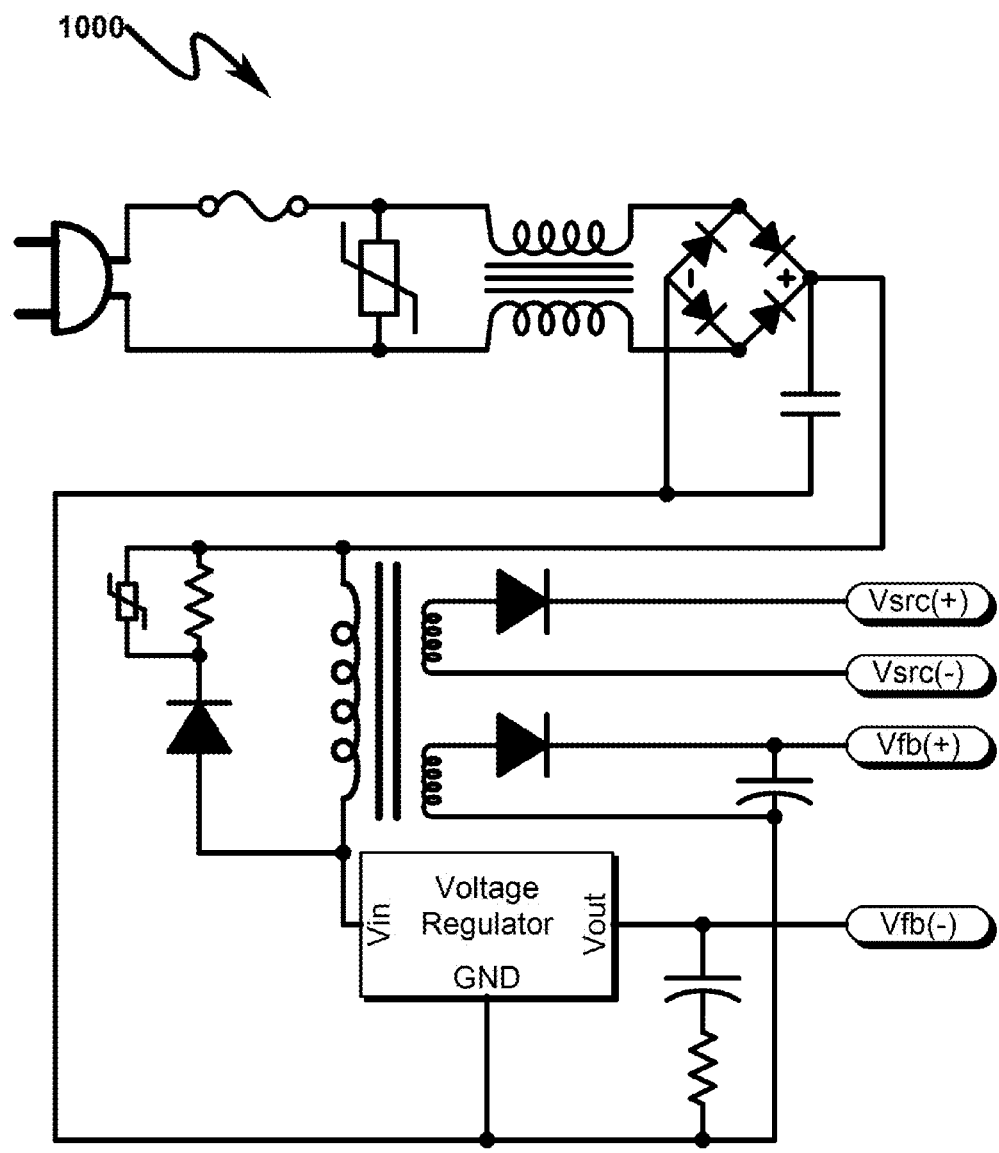
FIG. 10 illustrates an exemplary schematic of a preferred exemplary PSCU Line Power Interface embodiment.
Figure 11:
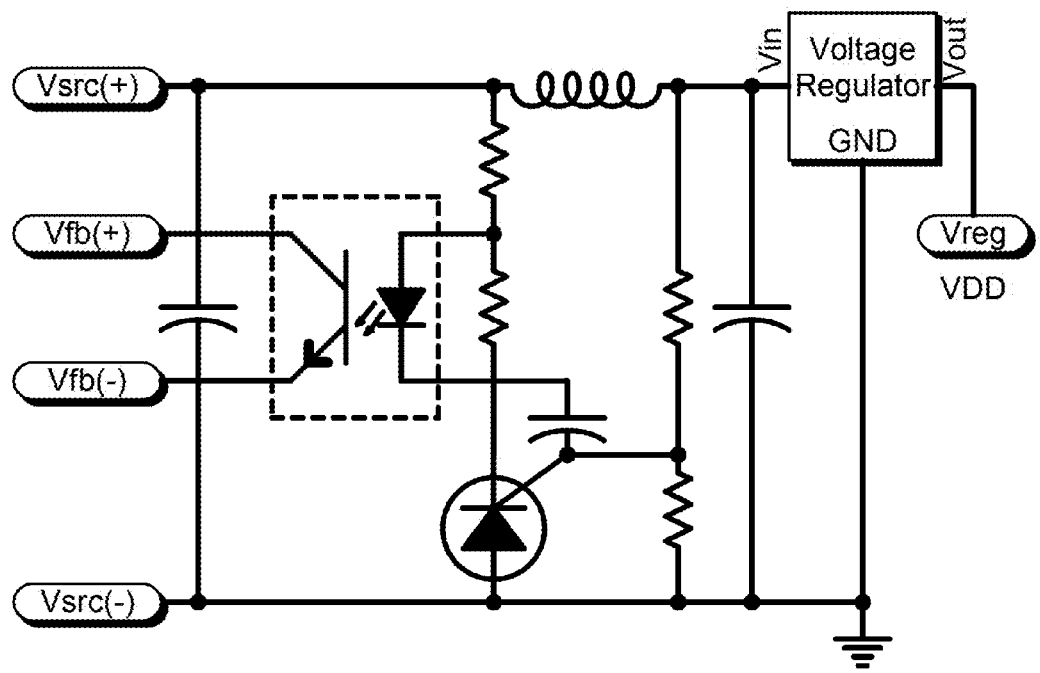
FIG. 11 illustrates an exemplary schematic of a preferred exemplary PSCU Voltage Regulator embodiment.
Figure 12:
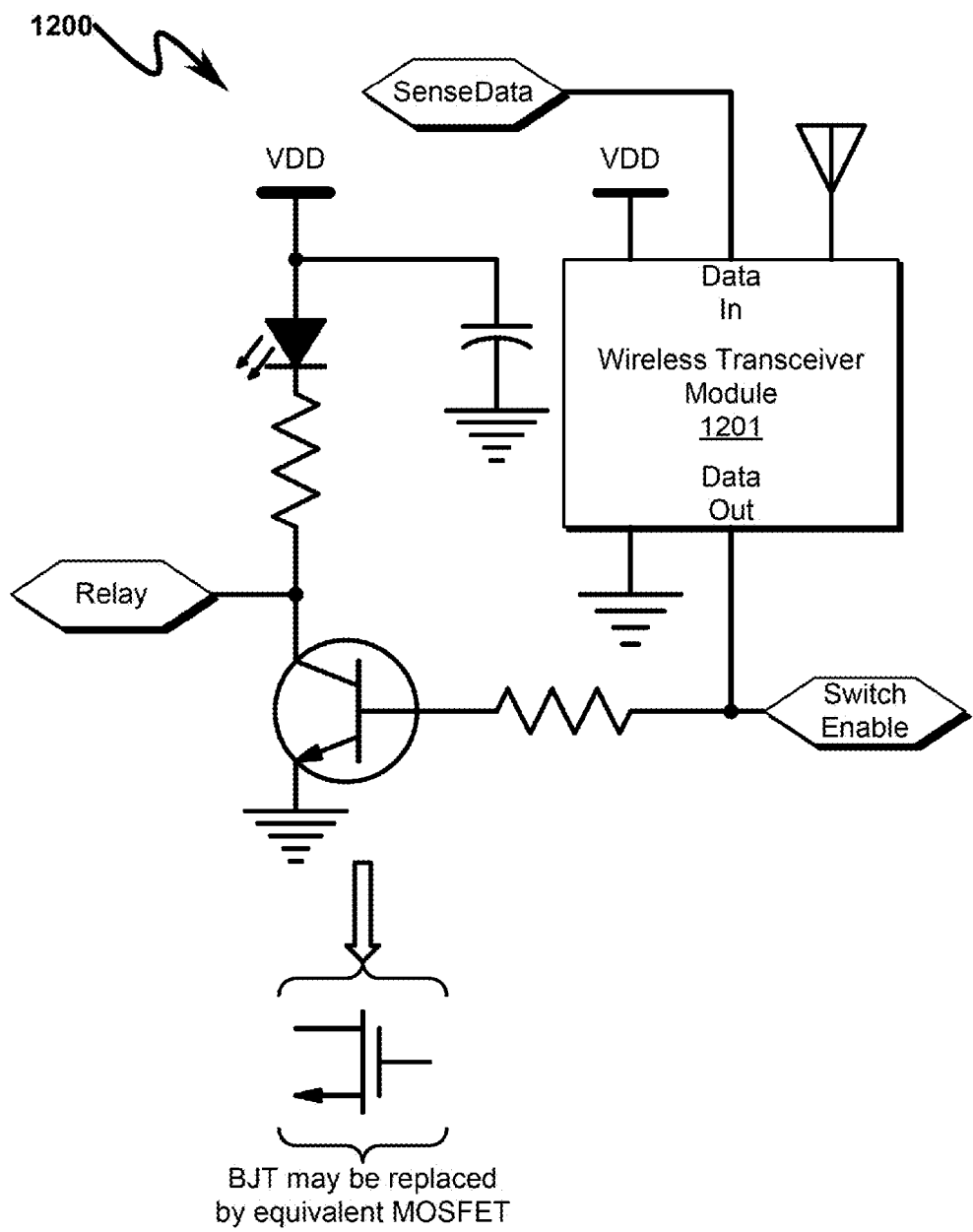
FIG. 12 illustrates an exemplary schematic of a preferred exemplary PSCU Wireless Communication Interface embodiment.
Figure 14:
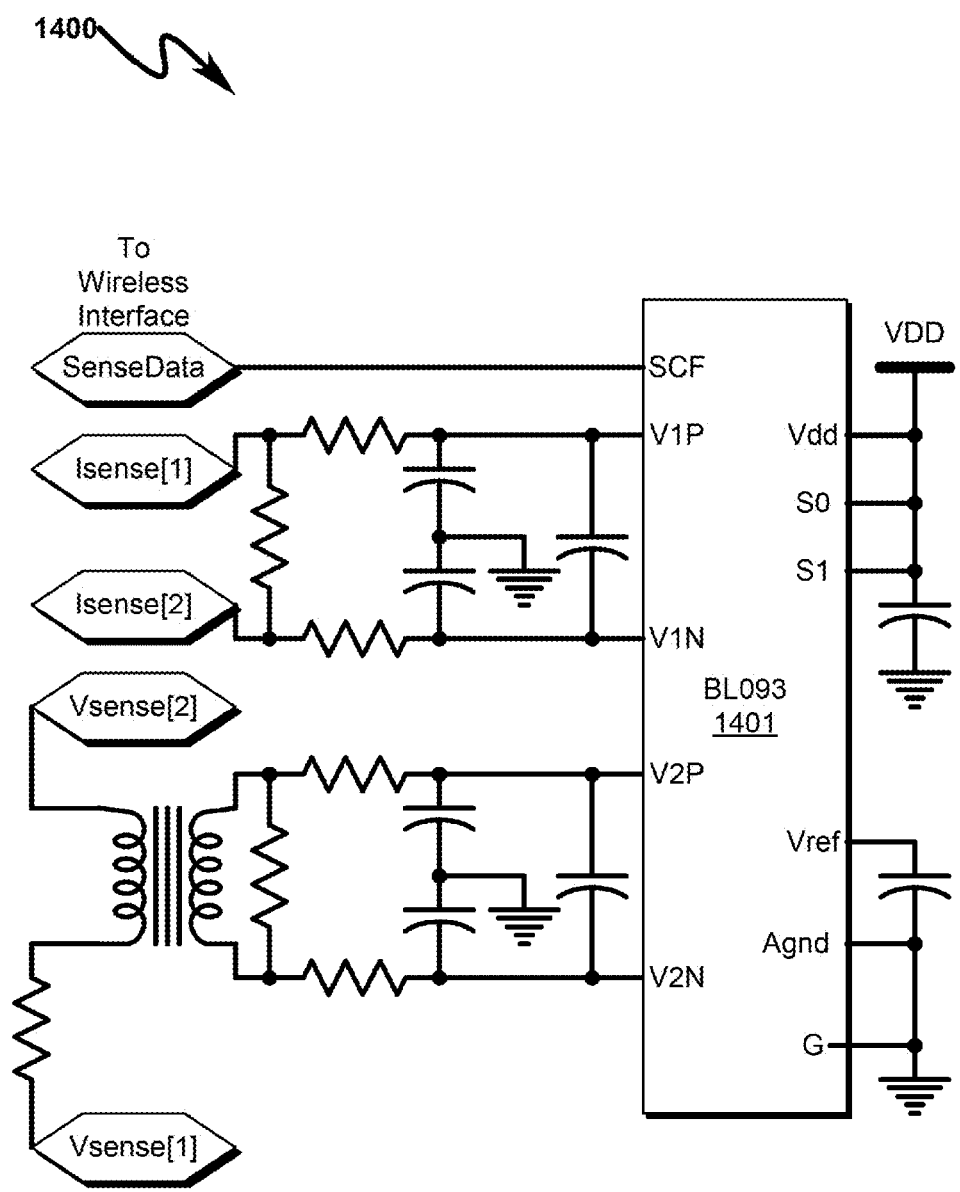
FIG. 14 illustrates an exemplary schematic of a preferred exemplary PSCU Optional Power Monitor/Diagnostics embodiment.

A preferred exemplary system electrical block diagram of a typical PSCU system is generally illustrated in FIG. 9 (0900), with exemplary detail of the block illustrated in FIG. 9 (0900) depicted in FIG. 10 (1000)-FIG. 14 (1400). This preferred embodiment comprises the following circuits:

- Line Power Interface (0901)—As detailed in FIG. 10 (1000), the input outlet brings 110V AC in through the fuse and split into two paths. The first path converts the AC voltage to a DC voltage by 4-diode bridge rectifier. A transformer steps down the voltage to the level for further regulation. DC regulator (U3) provides +5 VDC supply for the remaining circuits of the unit. The second path brings 110V AC voltage forward to the output socket via a power relay in the power switch (0904) by the output voltage is controlled as detailed in FIG. 13 (1300).
- Voltage Regulator (0902)—As detailed in FIG. 11 (1100), the DC Regulator brings +5 VDC from the line power interface (0901) further down to +3.3 VDC for supplying a wireless transceiver in the wireless communications interface (0903).
- Wireless Communications Interface (0903). As detailed in FIG. 12 (1200), a wireless transceiver (1201) receives the commands from the computer or/and other WiFi or wireless device. The received command via the wireless receiver interface (1201) provides a logic signal (SWITCH) to turn on/off the transistor switch (Q1). Q1 controls the on/off position of the power relay in the power switch circuitry (0904) based on commands from the PMCU and may optimally be implemented using bipolar or MOS fabrication technologies.

Figure 13:
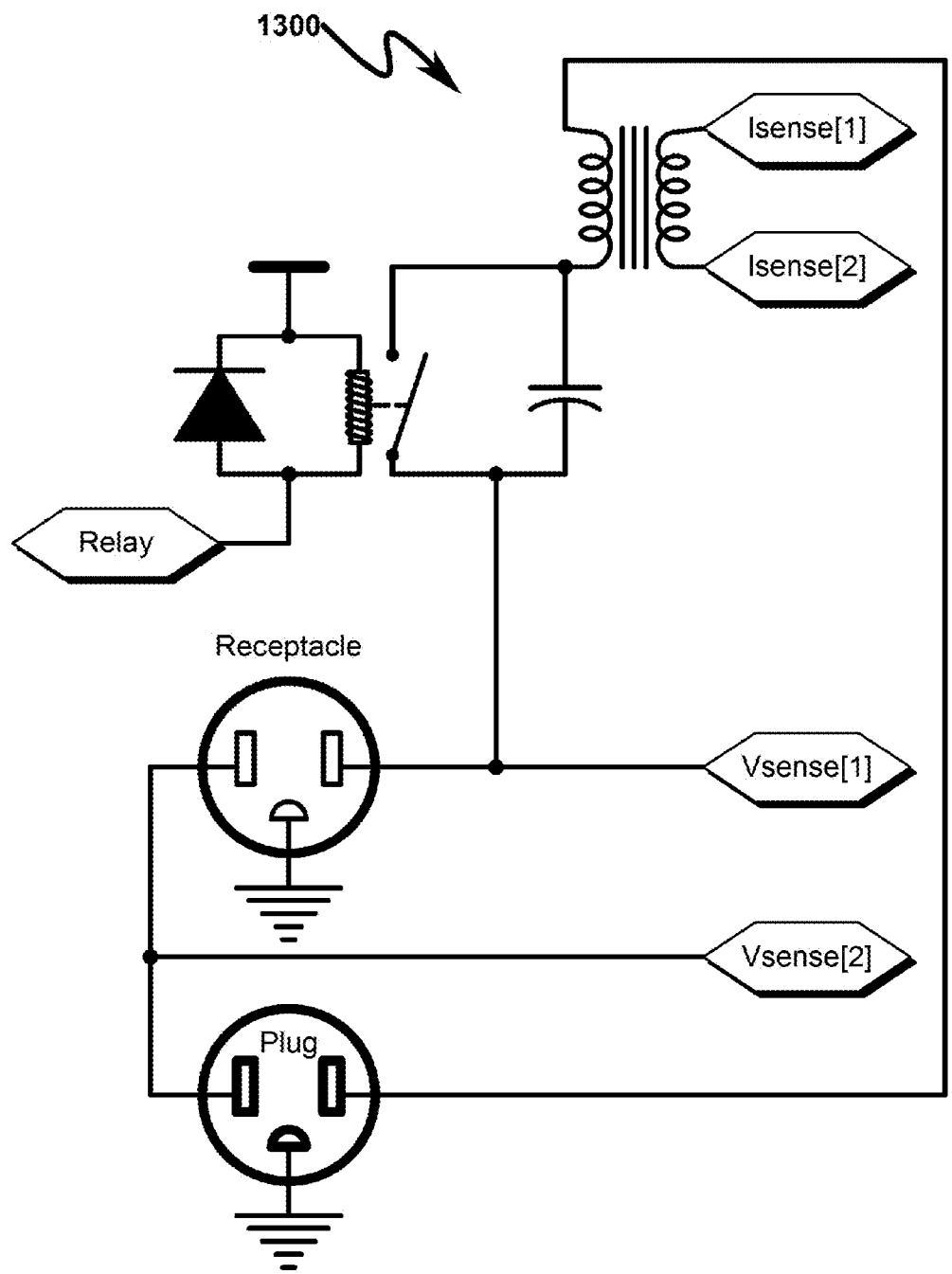
FIG. 13 illustrates an exemplary schematic of a preferred exemplary PSCU Electrical Power Switch (EPS) embodiment.

Power Switch (0904)—As detailed in FIG. 13 (1300), a power relay is a gate between the line power interface power input and the output power outlet and is controlled by the transistor switch in the wireless communications interface (0903). The power relay may be protected from over-current surges by a Zener or Schottky diode.

One skilled in the art will recognize that these functional blocks may be implemented in a wide variety of ways well known to those skilled in the art of circuit design and as such are only exemplary of the techniques taught by the present invention.

Battery Charger Charging Profiles (1500)-(1600)

Battery Charging Stages

Figure 15:
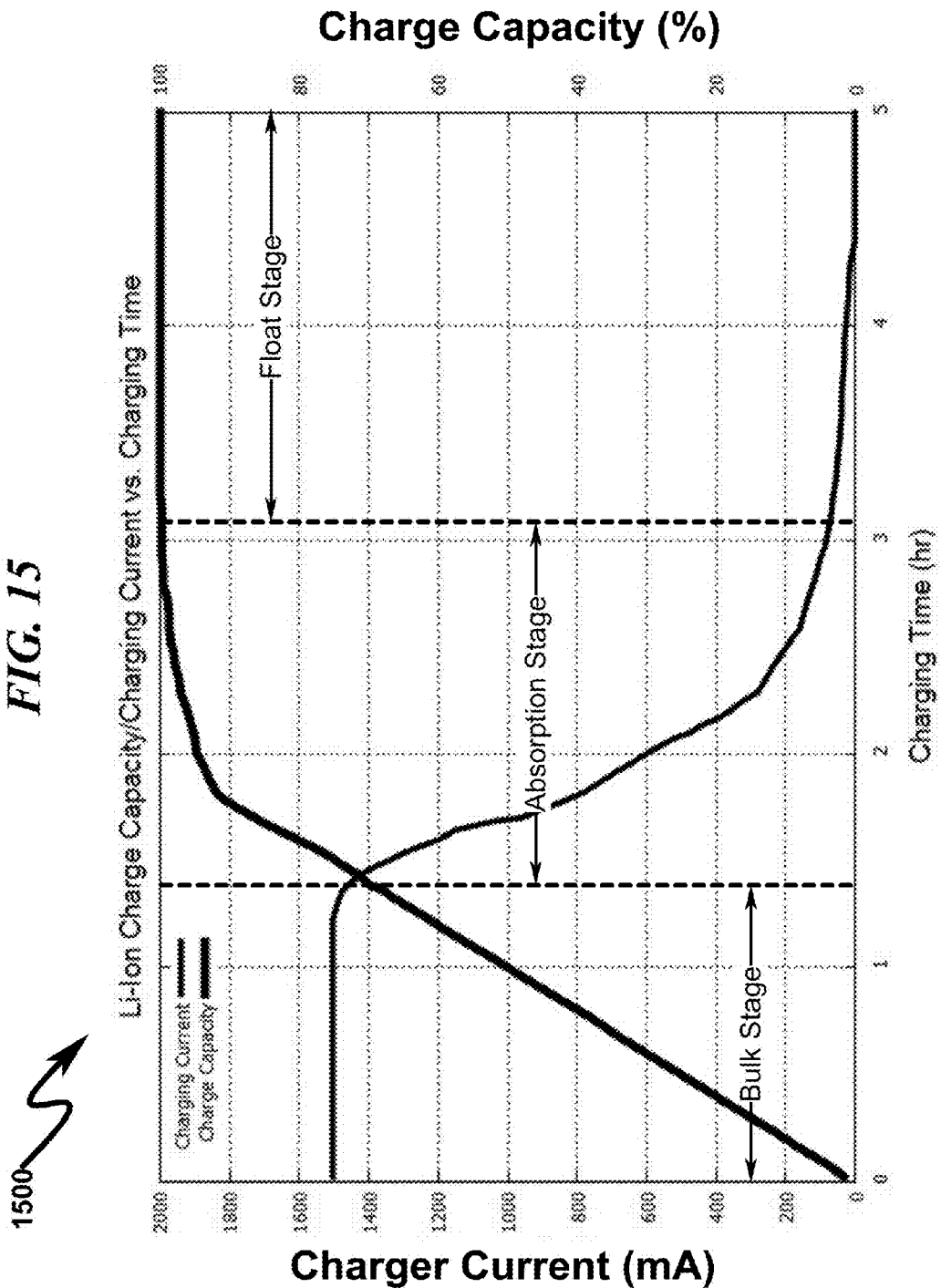
FIG. 15 illustrates a graph of exemplary Lithium ion battery charging characteristics depicting Bulk, Absorption, and Float charging stages.

The present invention only considers battery chargers that draw AC power from an AC power source such as a wall power outlet. As generally depicted in FIG. 15 (1500), the charging process in a typical battery charger configured in this application can be characterized into three stages:

Bulk Charge Stage. When the charged battery has low battery level, the input current to the charger is high, and will stay high for a while. This stage charges 80% of the battery capacity.

Absorption Stage. As the battery is charged, its battery capacity (or voltage level) goes high and the input current to the charger gradually goes down until the current is 1-2% of the maximum in the Bulk Charge Stage. This stage charges the remaining 20% of the battery capacity. The low current at the end of this stage is called trickle current. It is known that the trickle current has the damaging effect on batteries as it creates heat and chemical reactions.

Figure 16:
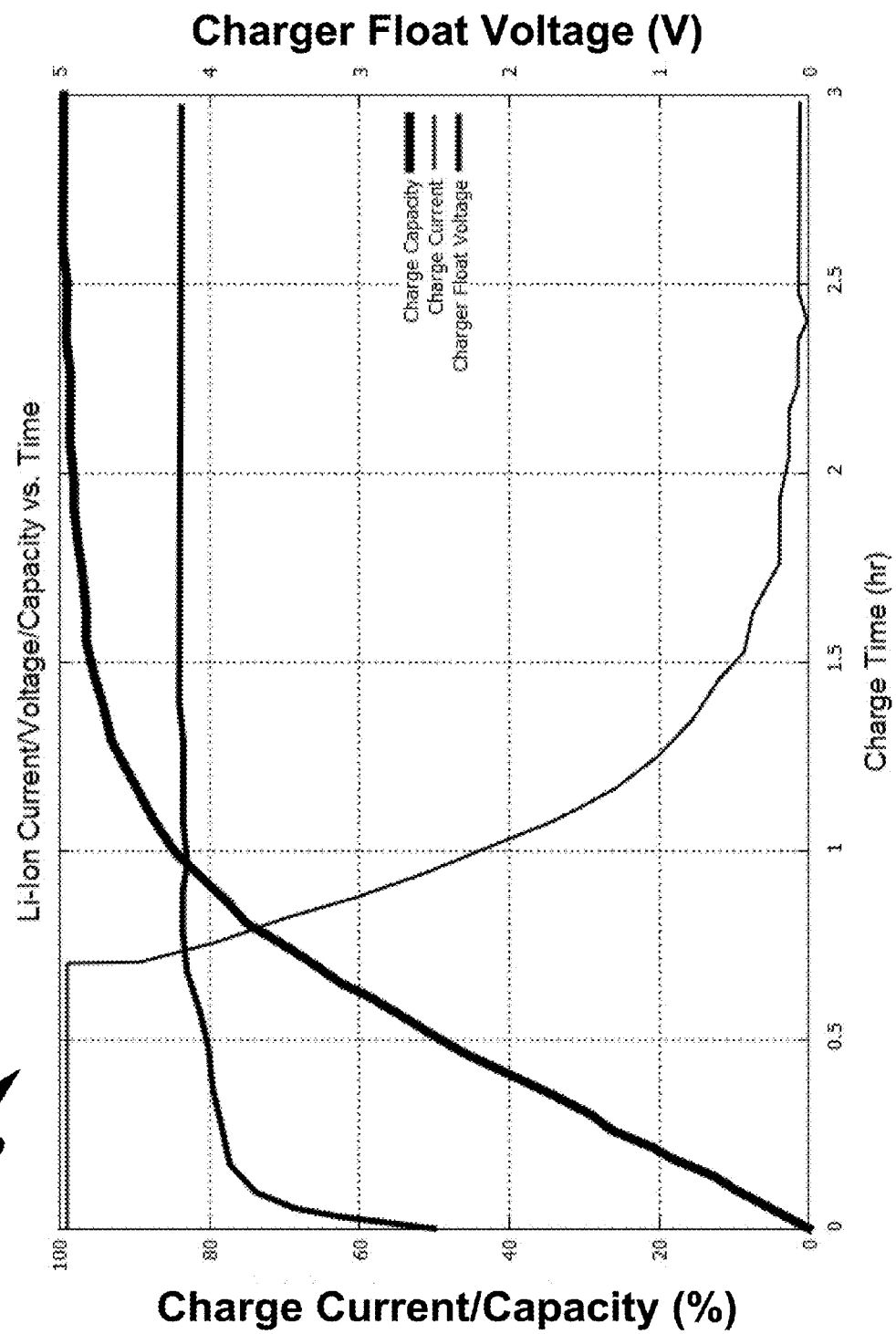
FIG. 16 illustrates a graph of exemplary Lithium ion battery charging characteristics depicting charge current, charge voltage, and charge capacity.

Float Stage. A lower voltage of charger is applied to the battery that will maintain the full charge. The trickle current continues to flow into the battery. This characteristic is more fully detailed in the battery charging graph depicted in FIG. 16 (1600).

It should be noted that the measured current from the AC source into the charger is so called RMS (root mean square) current, which is proportional to the DC current output of the charger. The power and the voltage referenced in this document are also typically measured as RMS values.

We call this three-stage process the charging profile of a charger, as shown in FIG. 15 (1500). The shape of the charging profile will vary with the types of batteries and the battery chargers, but the general trend is the same. By measuring the input current (or the power since the input voltage is a constant) to a charger, one can learn and build the profile specific to a battery and use that to aid the battery charger management.

Within the context of the present invention, the disclosed system/method uses measurements of the current into a battery charger in our discussion, but these discussions and disclosures are equally applicable to situation in which power is the monitored quantity.

Battery Life and Charging Level

It is well known that batteries such as Lithium ion batteries can last longer if they are not over-charged with trickle current. This is because overcharging causes damaging chemical reaction and heat to the batteries. In fact, experts suggest that the batteries should be charged only to 80-90% of their full capacity to have the longest life span. As a result, it is desired to know the battery capacity and stop the charging completely when a desired percentage point is reached. Unfortunately, few battery chargers in the market provide the flexibility to shut the charging completely at a point between 80% and 100% of battery capacity.

Bad Battery Detection

A bad battery can be detected if the input charging profile does not satisfy a normal one. For example, if the current does not drop after the expected charging time.

System Control Flow Detail (1700)-(2400)

Figure 4:
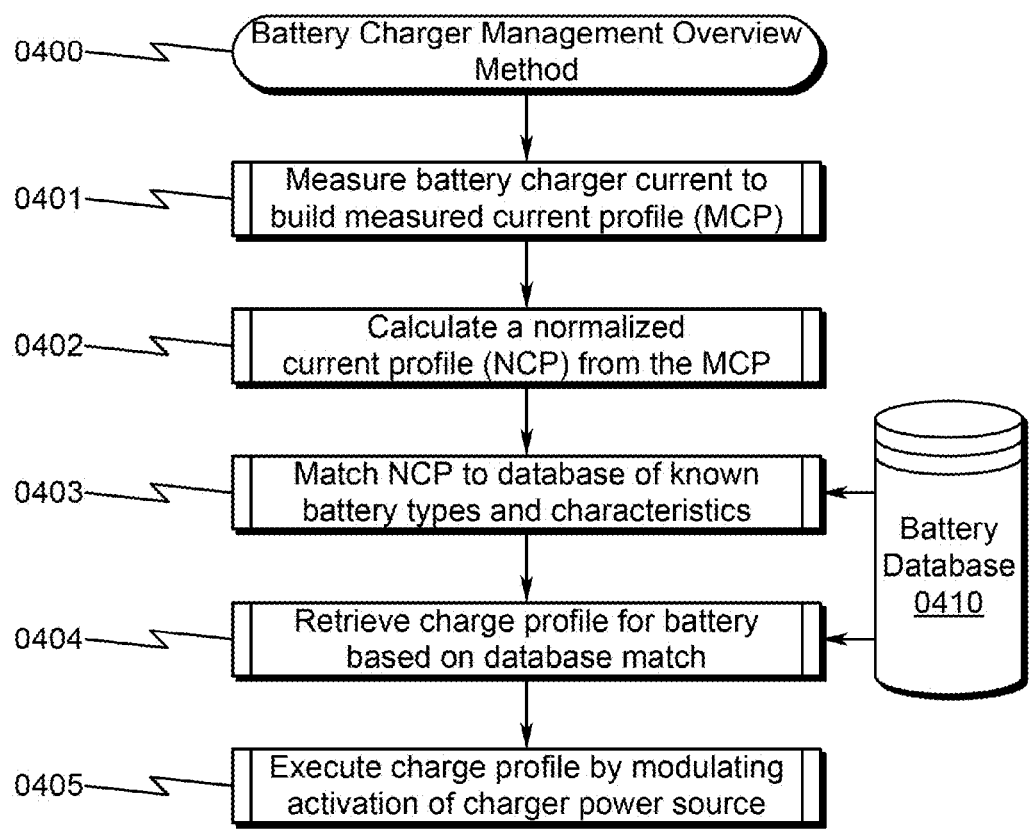
FIG. 4 illustrates an exemplary overview flowchart describing a presently preferred method embodiment of the present invention.
Figure 17:
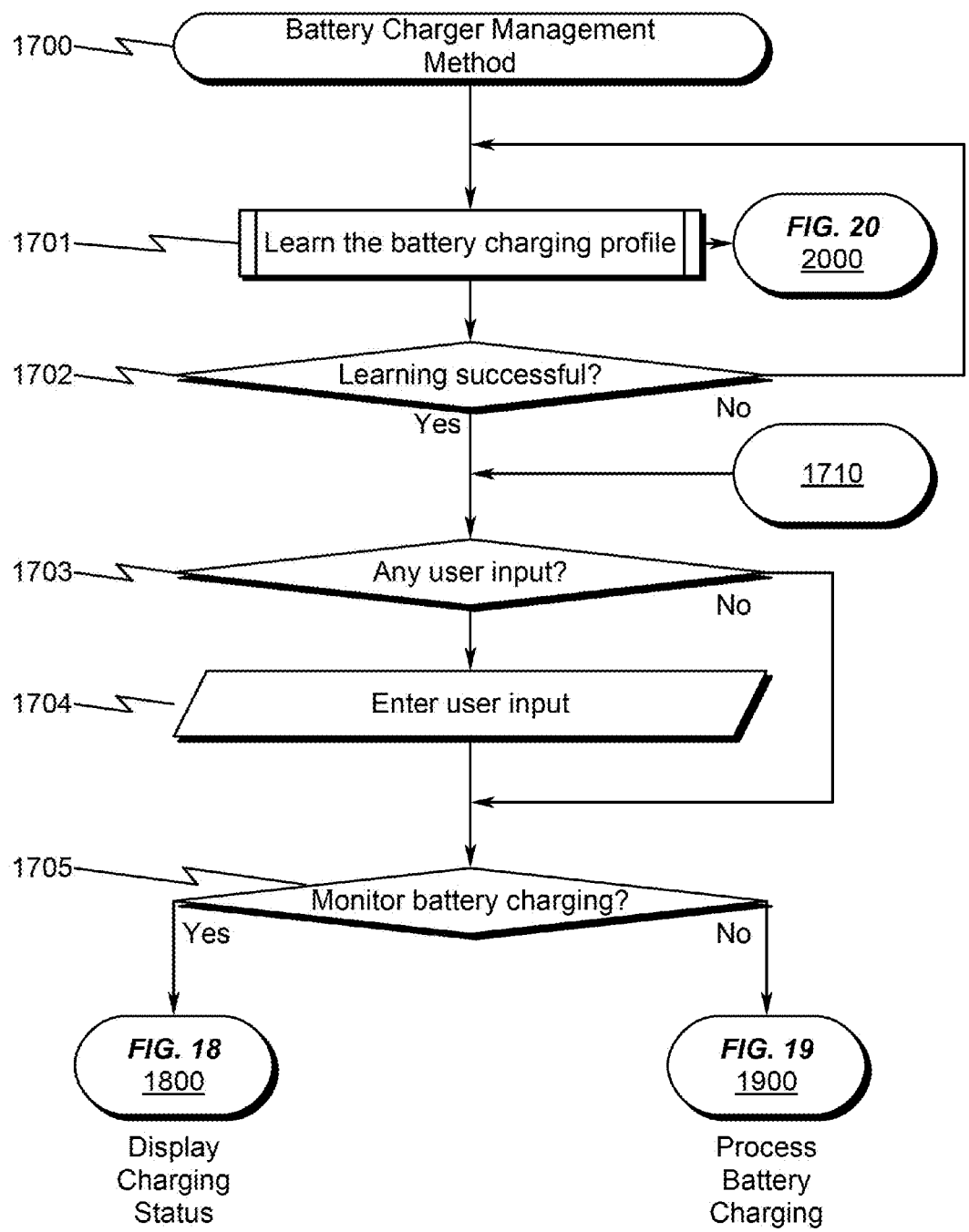
FIG. 17 illustrates a detailed flowchart of a preferred exemplary battery charger management method used in some preferred exemplary invention embodiments.
Figure 18:
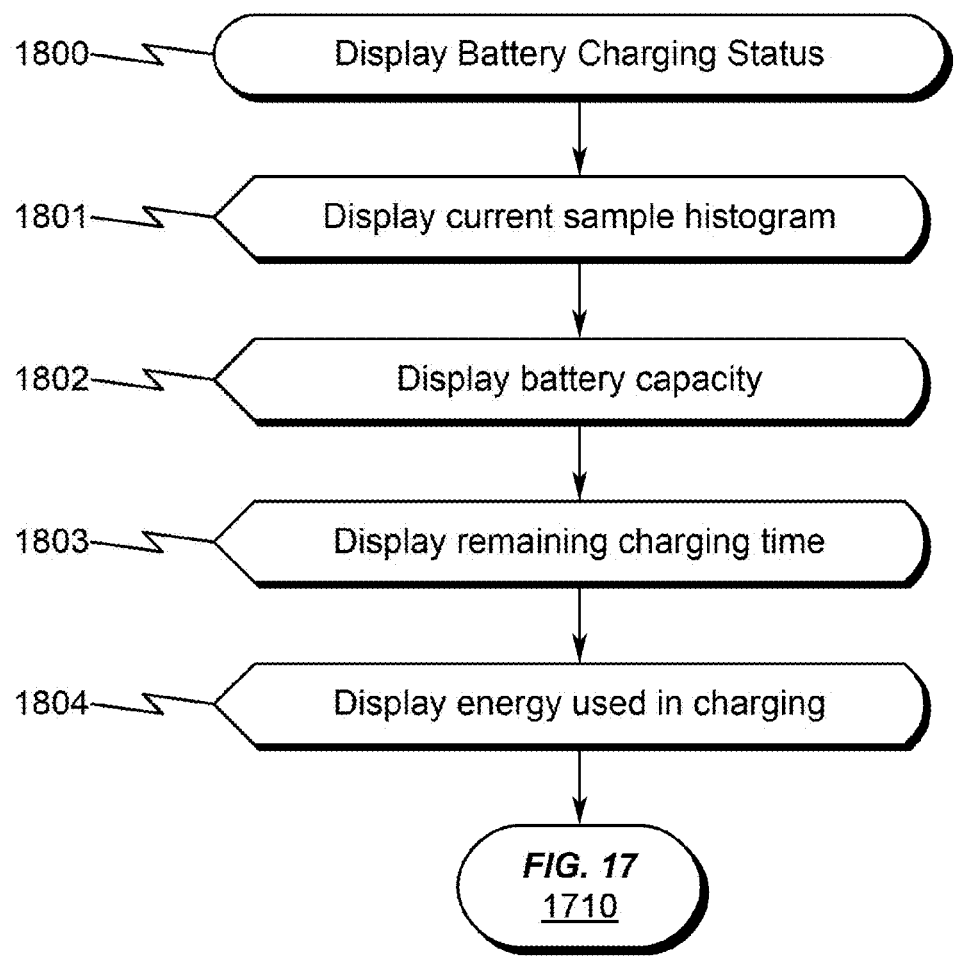
FIG. 18 illustrates a detailed flowchart of a preferred exemplary display battery charging status method used in some preferred exemplary invention embodiments.
Figure 23:
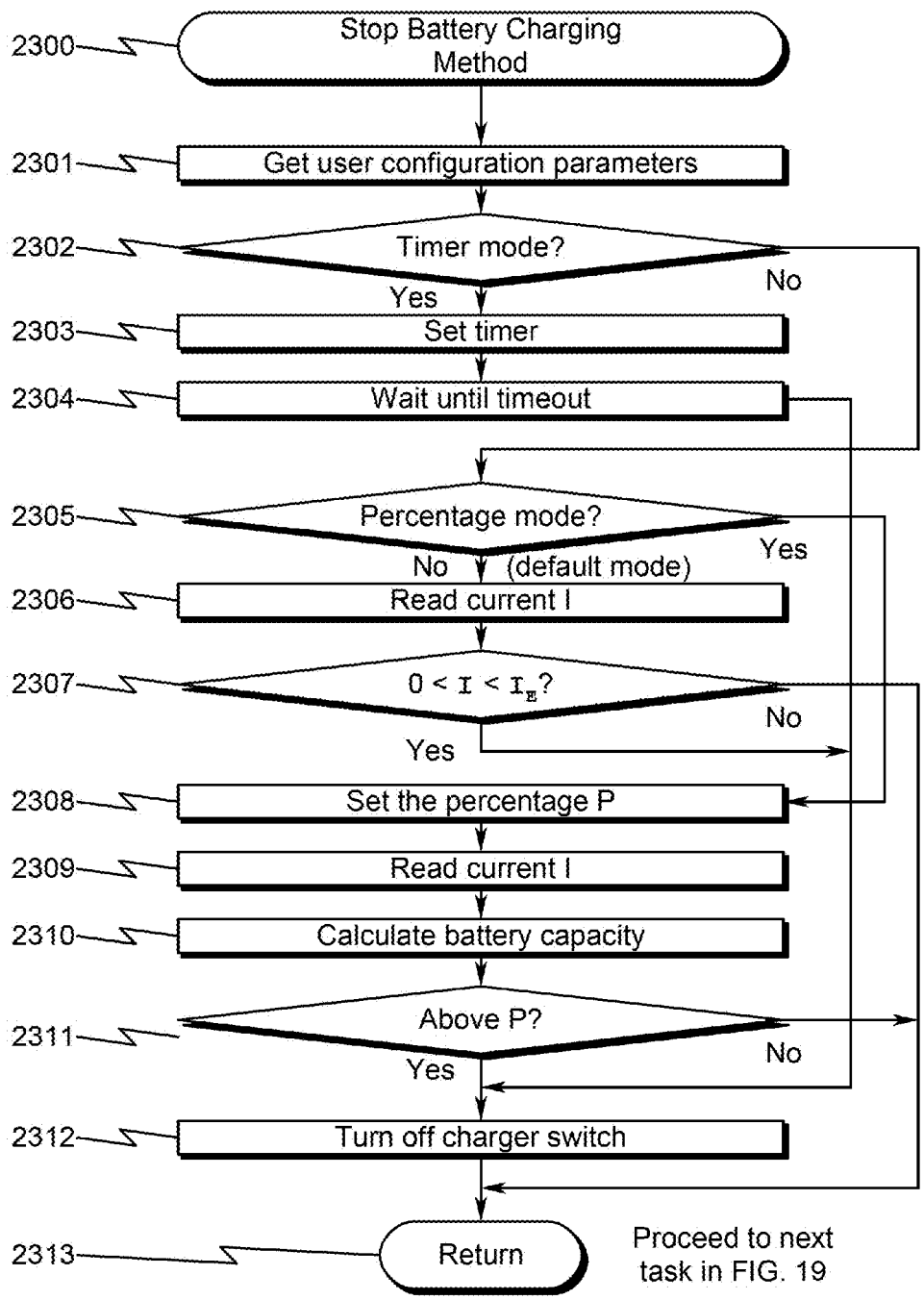
FIG. 23 illustrates a detailed flowchart of a preferred exemplary stop battery charging method used in some preferred exemplary invention embodiments.
Figure 24:
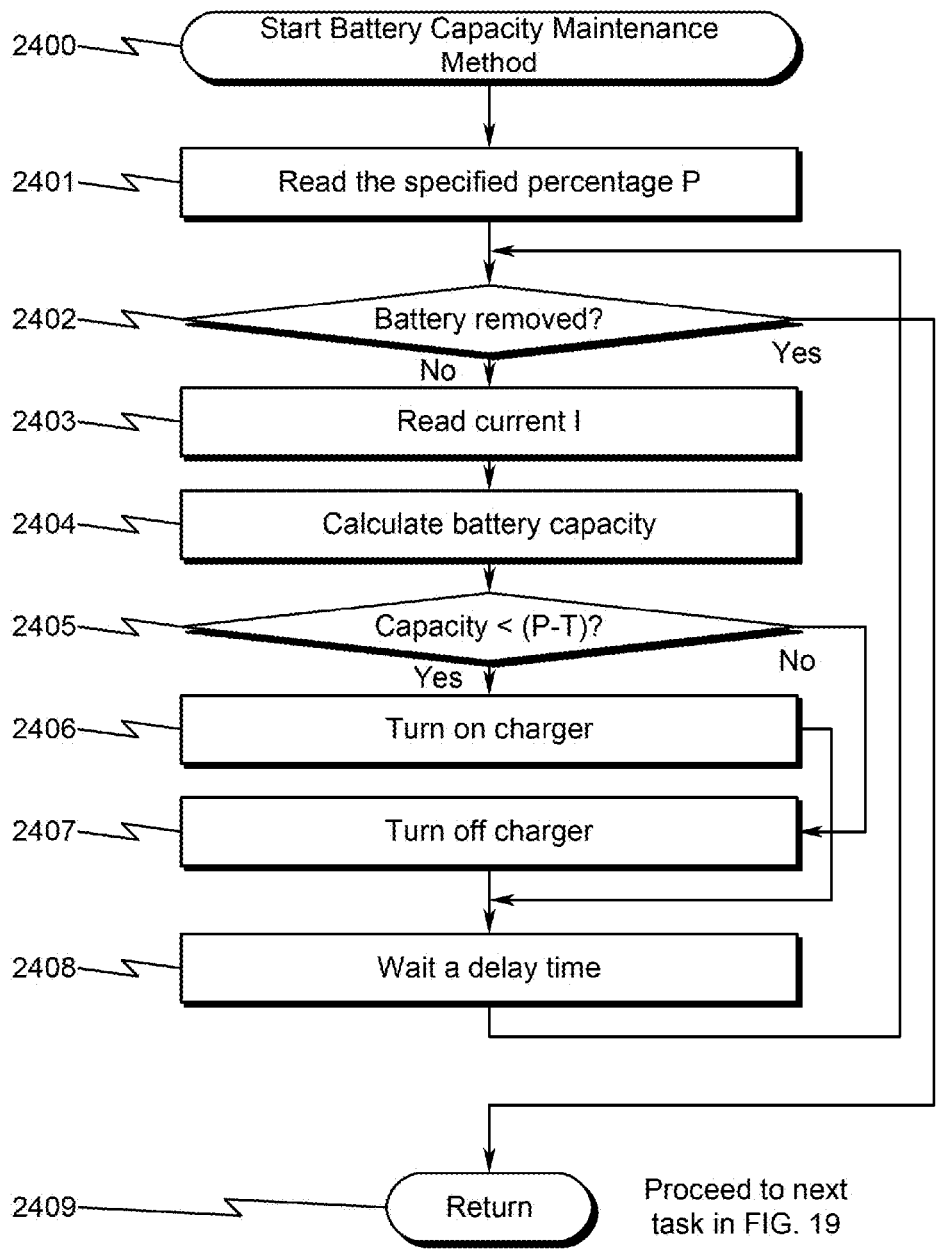
FIG. 24 illustrates a detailed flowchart of a preferred exemplary start battery capacity maintenance method used in some preferred exemplary invention embodiments.

While the methods taught by the present invention may vary widely based on application, the general control flowcharts depicted in FIG. 4 (0400) and FIG. 6 (0600) may in many circumstances be advantageously embodied in detail as illustrated in FIG. 17 (1700)-FIG. 24 (2400). Within this context, FIG. 17 (1700)-FIG. 19 (1900) depicts an overall battery charger supervisory control loop, FIG. 20 (2000)-FIG. 24 (2400) depicting detailed flows supporting battery charge profile learning (FIG. 20 (2000)-FIG. 21 (2100)), start battery charging (FIG. 22 (2200)), stop battery charging (FIG. 23 (2300)), and start battery capacity maintenance (FIG. 24 (2400)) methodology details.

The following discussion provides narrative detail supporting the general method flowcharts depicted in FIG. (1700)-FIG. 24 (2400). As the basis for battery charger management, a BCMD measures the input current to the connected charger in a charging process with its measurement unit. The measurements are used for two purposes: learning and monitoring.

Learning

As charging profiles vary with battery chargers and the batteries, a BCMD first uses the measurements to build a charging profile of the input current. The learned profile may be updated (or relearned) from time to time afterwards as a battery ages (as discussed later).

Figure 25:
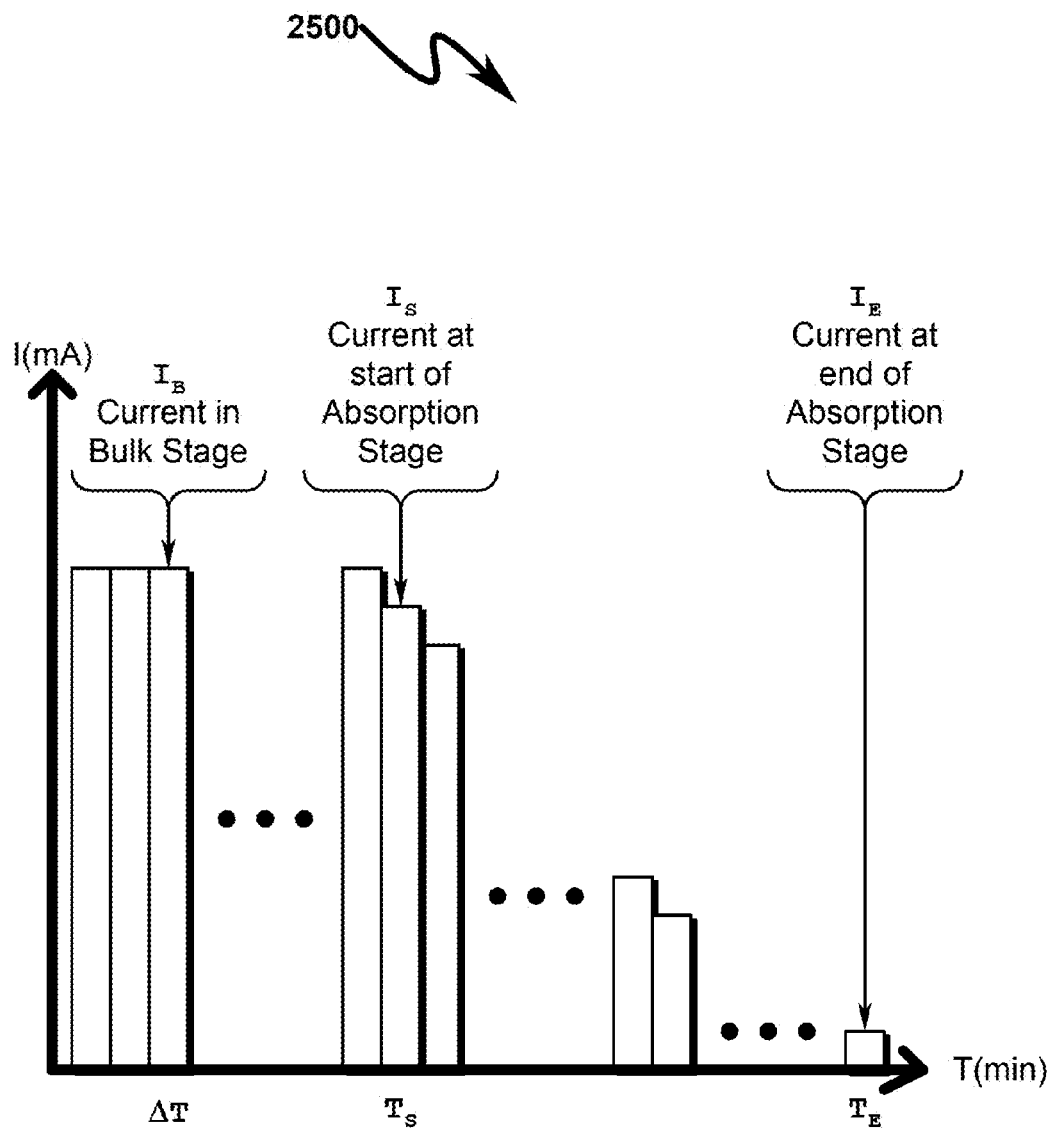
FIG. 25 illustrates a battery current histogram useful in understanding battery charging profile algorithms used in some preferred invention embodiments.

The charging profile data are a set of {current (A), time}={$I_K$, $T_K$} pairs sampled and saved in the memory of the microcontroller or other PMCU computing device. The profile data can be represented as a table of data or a histogram as depicted in FIG. 25 (2500). The measurements can be sampled in a configurable interval $\Delta T$ (e.g., 5 seconds).

Case 1: Find the Range of Absorption Stage

As discussed earlier, the critical and defining attributes of a charging profile are the following:

$I_S$—the current at start of the Absorption Stage;

$I_E$—the current at the end of the Absorption Stage; and $T_A$—the duration of Absorption Stage.

As an example, $I_S$=1 A, $I_E$=10 mA, and $T_A$=1.5 Hr.

There could be many ways to identify these two "turning points" of the charging profile. Here is one exemplary algorithm to find $I_S$, $I_E$, and $T_A$:

Given a set of input current and time samples {$I_K$, $T_K$}, K=1, 2, . . . , N, and the sample interval $\Delta T$;

Define $\epsilon_v$s and $\epsilon_A$, two configurable tolerance parameters used below. The algorithm described herein may typically initially let $\epsilon_v$=10 mV and $\epsilon_A$=0.5*$\Delta T$ Let $\Delta I_K = I_{(K+1)} - I_K$; K=1, 2, . . . , N−1; the difference between two consecutive current samples (think of this as the derivative of the profile trajectory).

Let $\delta I_K = \Delta I_{(K+1)} - \Delta I_K$, K=1, 2, . . . , N−2, the difference of the difference (think of this as the $2^{nd}$ order derivative).

Algorithm to Find $I_S$

Iterate over all K until achieving a P such that $$\Delta I_K > \Delta I_P + \epsilon_v$$

and $$abs(\delta I_K) > abs(\delta I_P) + \epsilon_A$$

for $K=P+1, P+2, P+3$ then $I_S = I_P$ (the current associated with sample $P$)

and $T_S = T_P$ (the time associated with $I_S$).

Basically, the algorithm searches for a point after which the trajectory drops significantly and it becomes curvy (i.e., $2^{nd}$ order derivative has larger magnitude) over three or more consecutive samples.

Algorithm to Find $I_E$

After finding $\{I_S, T_S\}$, continue from $\{I_K, T_K\}$, K=P+1, P+2, . . . , N, until achieving a Q such that $$\Delta I_K < \Delta I_Q - \epsilon_v$$

and $$abs(\delta I_K) < abs(\delta I_Q) - \epsilon_A$$

for $K=Q+1, Q+2, Q+3$;

then $I_E = I_Q$ (the current associated with sample $Q$)

and $T_E = T_Q$ (the time associated with $I_E$).

Basically, the algorithm searches for a point after which the trajectory becomes flat and it becomes less curvy (a trickle current has a constant value) over three consecutive samples.

Algorithm to Find $T_A$

The Absorption Stage is then determined by the formula:

$$T_A = T_E - T_S.$$

Figure 20:
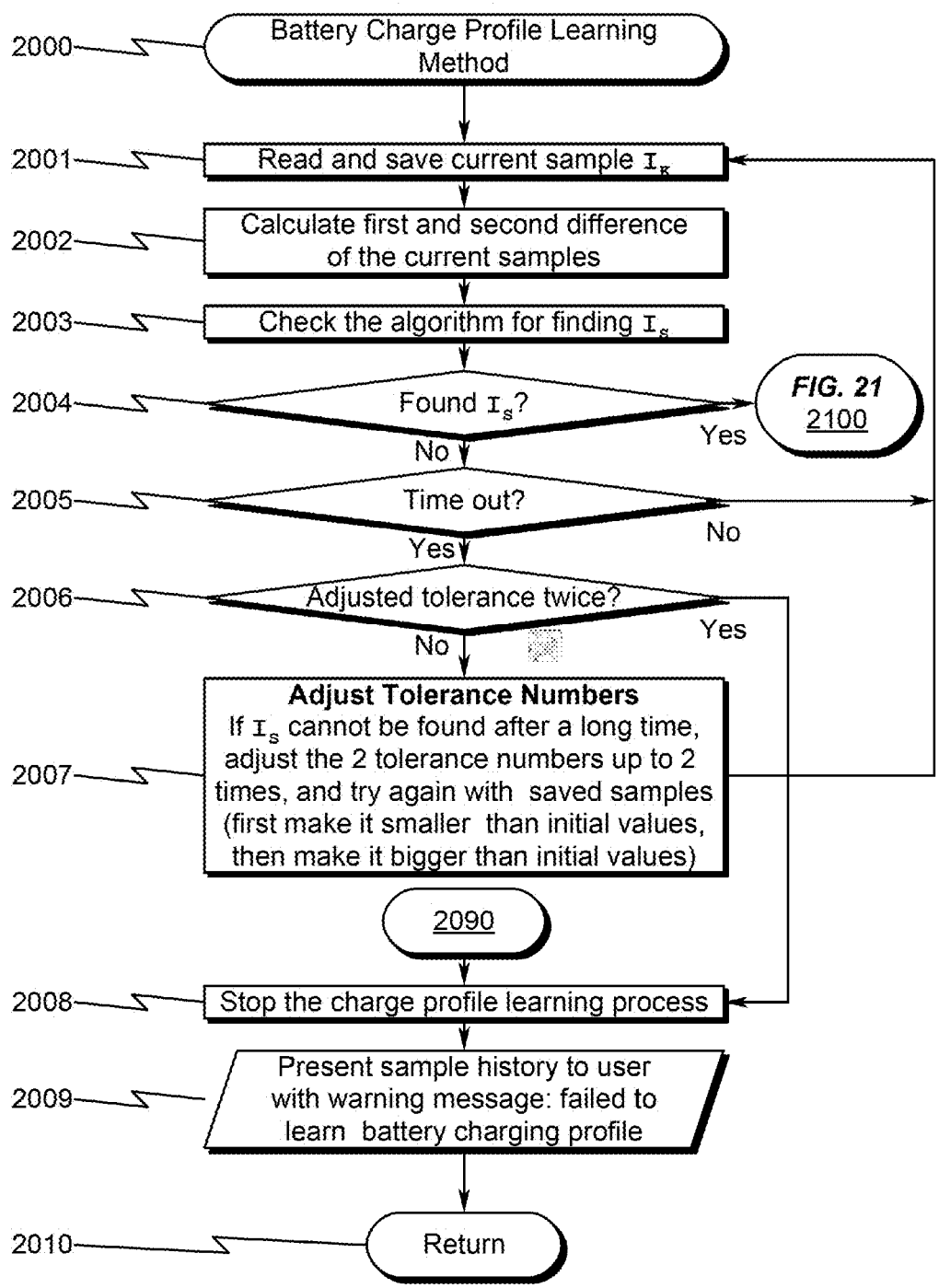
FIG. 20 illustrates page 1/2 of a detailed flowchart of a preferred exemplary battery charge profile learning method used in some preferred exemplary invention embodiments.
Figure 21:
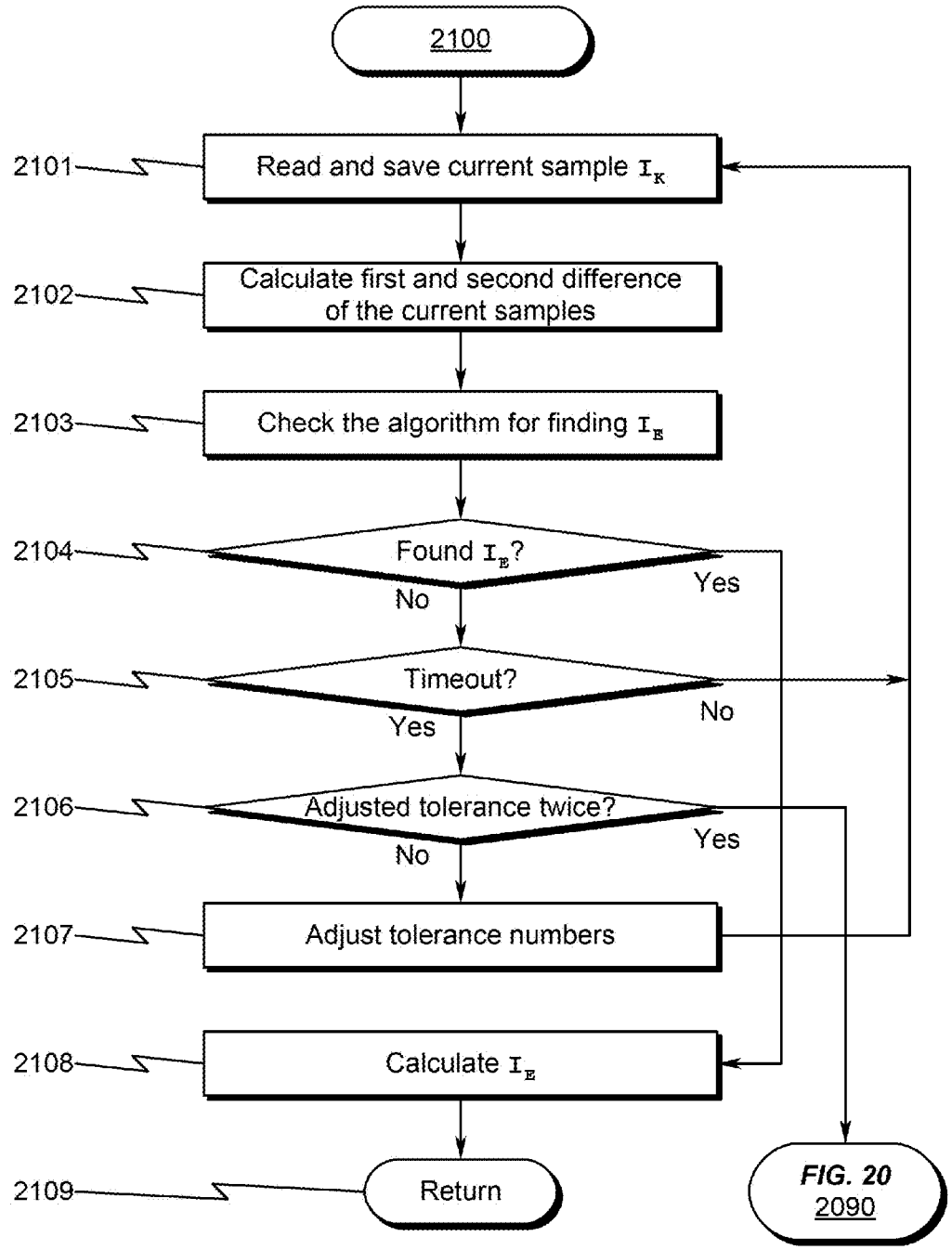
FIG. 21 illustrates page 2/2 of a detailed flowchart of a preferred exemplary battery charge profile learning method used in some preferred exemplary invention embodiments.

This algorithm may fail if the battery is already close to full before charging, so that it does not go through the three stages. It is a fair assumption, however, that sooner or later a low capacity battery will be charged. It is possible the tolerance values ($\epsilon_v$s and $\epsilon_A$) are either too large or two small, causing the algorithm to fail. A battery might be bad so that the current does not follow the characteristics of a typical charging profile. The real-time algorithm must consider all the possibilities, as illustrated in the flowcharts of FIG. 20 (2000) and FIG. 21 (2100).

Case 2; Find the Range of Bulk Stage as Well as Absorption Stage

If a battery is charged that has close to zero capacity then a more complete charging profile can be constructed. In this case, there are three critical points of interest: $[I_B, 0]$, $[I_S, T_S]$ and $[I_E, T_E]$; where $I_B$ is the input current at the start of the Bulk Stage at time T=0, $[I_S, T_S]$ and $[I_E, T_E]$ are calculated as in CASE 1. With this profile it is known that the time range [0, $T_S$] is for the Bulk Stage as well as the time range $[T_S, T_E]$ being for the Absorption Stage. These time intervals are further detailed in FIG. 25 (2500).

Case 3: Use a Database

A battery database may be constructed that contains charging profiles obtained as in CASE 2 for all types of batteries available. The battery database may in some preferred embodiments be hosted on a web server. Users may specify via a user interface the brand name of the battery. The microcontroller (or other PSCU computing device) in the BCDM can go to the database to look for the charging profile for the given brand name. If the BCMD finds it, it may download the information, and uses that battery characteristic profile as the initial charging profile.

Updating the Charging Profile

As a battery ages, its charging profile may change. From time to time (say, for every 10 charges) its profile is updated (or relearned) with the sampled current data.

If different batteries are charged by the same battery charger, the BCMD may keep charging profiles for different batteries. Consumers can specify the brand name and assign an ID to a battery to be charged, so that the BCMD can make the correct association.

Based on the profile, the next time a battery is charged, it is possible to detect what percent of the battery capacity has been charged; and
the remaining charging time.

Charged Battery Capacity Estimate

Based on the assumption that the Absorption Stage is responsible for the remaining 20% of the battery capacity, the following empirical formula may be used for calculating the battery capacity over 80%:

$$\text{Percent of battery capacity (above 80\%)} = 0.8 + 0.2*(I-I_S)/(I_E-I_S)$$

where $[I_S, I_E]$ is the current range for Absorption Stage and $I$ is the measured current between $[I_S, I_E]$.

Note that this formula only addresses battery capacity above 80%. This information may be used in turning off the charger if users want to stop the charging between 80-100% of its capacity.

Remaining Charging Time Estimate

During the charging process, the remaining charging time may be estimated as follows:

Given the measured current I, if battery charging is in the Absorption Stage, the remaining time is estimated as $$T = (T_E - T_S)*(I_E - I)/(I_E - I_S)$$

If the charging is in Bulk Stage, consider two cases:

Case A: we know the complete charging profile characterized by $[I_B, 0]$, $[I_S, T_S]$ and $[I_E, T_E]$, as obtained in LEARNING CASE 2. In this case, the remaining time is estimated as $$T = (T_S - T) + (T_E - T_S)$$

Case B: we only know $I_S$, $I_E$, and $T_A$ obtained in LEARNING CASE 1. In this case, the remaining time is estimated as $$T = 2*T_A - T$$

where it is assumed that the Bulk Stage duration is about the same as Absorption Stage.

Energy Consumed

The following equation provides the energy consumed from the start to present of the charging process:

$$E = \Delta T * V * (I_1 + I_2 + \ldots + I_N) = \Delta T(P_1 + P_2 + \ldots + P_N)$$

where

V is the input voltage to the charger (a constant) and $P_K, K=1, 2, \ldots, N$ are samples of the power.

In the United States, the AC input voltage to the charger is approximately 120 volts.

Monitor Battery Charging

To summarize, a BCMD allows users to monitor the charging status in terms of the following:

- The charging history since the start of the charging up to present in the form of a histogram of current vs. sample instances;
- The current battery capacity;
- The remaining charging time; and
- The energy consumed since the start of the charging.

The present invention anticipates that the BCMD may communicate through the Internet with an external server or a user device. The BCMD may also host a web server in its microcontroller (or other PSCU computing device). A person skilled in software can implement a user interface for users to remotely monitor the changing status of the battery charger using this web server.

Control Battery Charger

The present invention anticipates that remote user control of the BCMD may permit remote users to turn on and off the switch of the BCMD at any time to start and stop the battery charger. In addition, users can schedule the tuning on and off of the switch in the future based on time or based the battery capacity. The scheduling capability may be disabled to make a BCMD a pure battery monitoring system.

Schedule the Start

Figure 22:
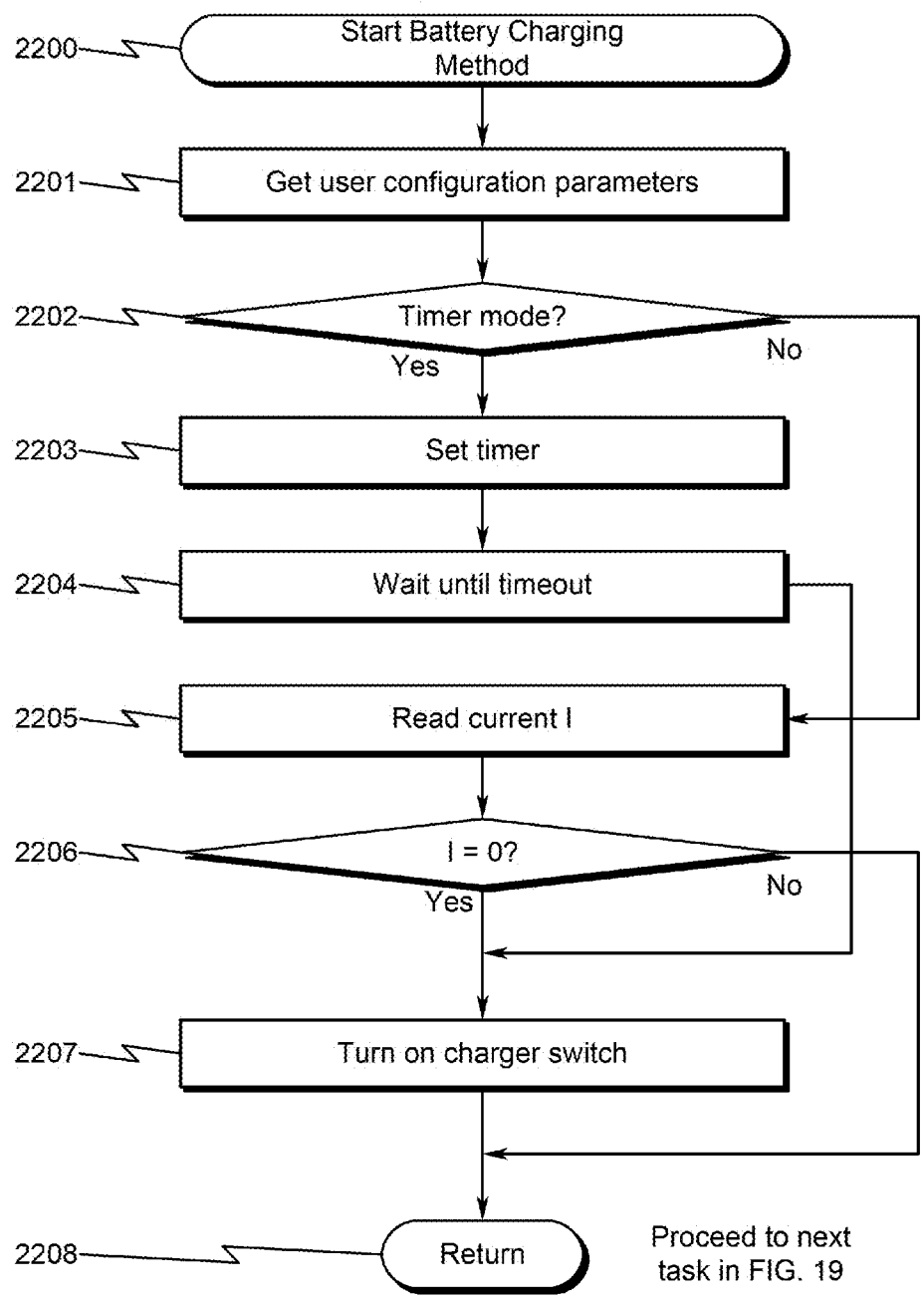
FIG. 22 illustrates a detailed flowchart of a preferred exemplary start battery charging method used in some preferred exemplary invention embodiments.

As generally illustrated in the flowchart of FIG. 22 (2200), users can specify when to start the charger in the following two modes:

- Timer mode: at a time in the future, e.g., at 8:00 PM tonight.
- Default mode: the BCMD will turn on the switch if the current is zero, meaning the battery is removed from the charger or the charger itself is turned off or not connected to the BCMD. This is done by first switching on to measure the current. If the current is zero, the switch remains enabled; otherwise the BCPS power switch is turned off.

Schedule The Stop

DOCUMENT BMSM presents a method for turning off a charger. This disclosure used the battery capacity measurement and the charging history to make the decision on when to turn off the charger. The methods disclosed in DOCUMENT BMSM also apply to implementations of the BCMD with the battery capacity being estimated as discussed above.

In particular, as generally illustrated in the flowchart of FIG. 23 (2300), users have three options to specify when to stop the charger:

- Timer mode: at a time in the future, e.g., 2 hours after the start;
- Percent mode: users specify a percentage between 80% and 100%; the BCMD monitors the current, calculate the battery capacity, and turn off the switch when the percentage point is reached;
- Default mode: the BCMD will turn off the charger when the end of Absorption Stage is reached ($0 < I <= I_E$).

The BCMD may be configured to communicate through Internet with an external server or a user device. The BCMD may also host a web server in its microcontroller (or internal PSCU computing device). A person skilled in software development can implement a user interface that allows users to configure the BCMD to start and stop the battery charger in the ways described above.

Maintain the Battery Level

Unless the battery is removed from the charger, if the battery charger is turn off, the battery will start to discharge albeit at a very low rate. To maintain the battery level, a BCMD must turn on the charger from time to time to check if the battery capacity (between 80-100%) has dropped by checking the capacity. If the battery capacity has dropped beyond a threshold, keep the switch on for a while until the target battery capacity is reached; otherwise, turn off the switch. Since the battery discharging is low, this maintenance can be done at a low frequency, for example, every 10 minutes.

Assume that a threshold is defined as T=3%, an exemplary algorithm for maintaining the battery capacity is given in FIG. 24 (2400). Note that in this exemplary procedure battery maintenance is started as an asynchronous background procedure and exited when the battery is detected as removed from the battery charger.

Charging History

The current and past battery charging data may be saved in a database for an arbitrary time (i.e., 6 months). The saved data may include, but is not limited to:

- The number of total charges over the period;
- The time each charge happened, e.g., Dec. 1, 2012, 6:00 PM;
- The duration of each charge, e.g., 2.5 hour;
- The charging profile of each charge ($I_B$, $I_S$, $I_E$, $T_S$, $T_E$, and optionally, the sample data as well); and
- The energy consumed for each charge.

This saved data contain valuable information consumers can use to see the usage patterns and the health of the batteries.

Networking

A BCMD may be configured to communicate with the Internet through a wireless communication module. The communication with Internet serves three purposes:

- maintenance such as software upgrades and obtaining the database information for the charging profile of a battery;
- communication with a central server to report its status and data and get control command from it; and
- interface with a user though Internet communication.

Some preferred embodiments of the present invention may use a WiFi communication module as one instantiation of the wireless module, but any wireless modules that can reach Internet may be used in this context.

In addition, the microcontroller of the BCMD may hosts an embedded web server for users to interact with a web page to monitor and control the battery changer.

In summary, a user can access a BCMD in the following ways:

- Via connection with BCMD, for example, using any Wifi device, and open a web page on the device;
- Via a central server on the Internet that communicates with BCMDs as a proxy (the user may go to a web page of that server to interact with a BCMD); and
- Via download of an application to their smartphone/laptop/mobile device, and interact with that application (in this instance the application hides the communication with BCMD, and simplifies the interaction with BCMD).

Users can access a BCMD from anywhere and anytime utilizing access methodologies described in the patent application incorporated herein by reference.

Summary

Figure 19:
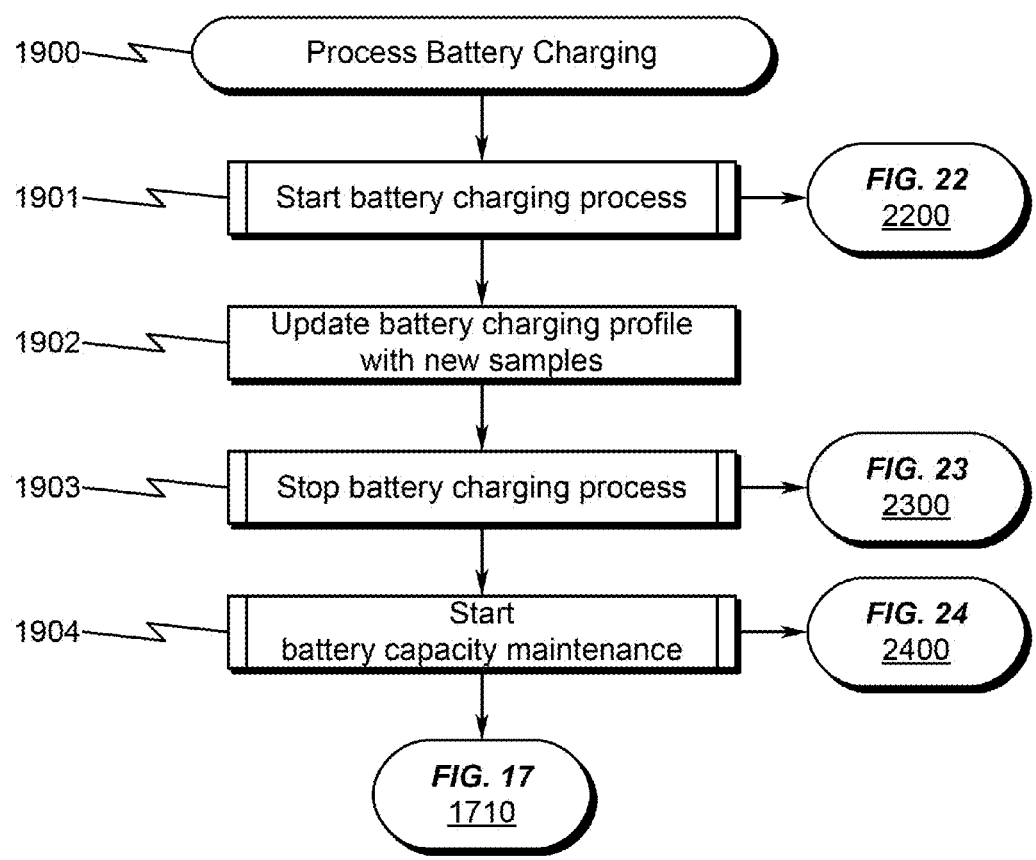
FIG. 19 illustrates a detailed flowchart of a preferred exemplary process battery charging method used in some preferred exemplary invention embodiments.

The flowcharts provided in FIG. 17 (1700)-FIG. 19 (1900) summarize the functionality of a BCMD discussed so far. In summary, the BCMD as described herein and taught by the present invention:

- samples the input current flowing into a battery charger using a current/power measurement unit;
- learns the battery charging profile (characteristics containing three charging stages);
- estimates the battery capacity;
- estimates the remaining charging time;
- calculates the consumed energy in charging a battery;
- allows users to turn on the battery charger at any time or based on the battery characteristics;
- allows users to turn off the battery charger at any time or based on the battery characteristics;
- maintains the battery capacity after the charging is stopped;
- keeps the charging history including time of each charge, the duration of each charge, the energy consumed for each charge, among other things;
- incorporates a microcontroller (or other computing device) and a wireless communication module that allows user to monitor and control the charger remotely from anywhere over Internet.

The prior art does not teach singularly or in combination systems/methods that achieve these functions.

PMCU to MCD Communications

While many methods of communication between the PMCU and remote mobile communication devices (MCDs) are anticipated, several are preferred, including but not limited to:

- a wireless hardware interface;
- a BLUETOOTH® wireless hardware interface;
- a USE hardware interface;
- a UART hardware interface;
- a serial hardware interface;
- a parallel hardware interface;
- an Ethernet hardware interface; and
- a wireless Ethernet hardware interface.

One skilled in the art will recognize that a wide variety of wired and/or wireless data transmission methodologies may be utilized to implement the communication link between the PMCU and the PSCU.

Exemplary Remote Control by Web Access (2600)

Figure 26:
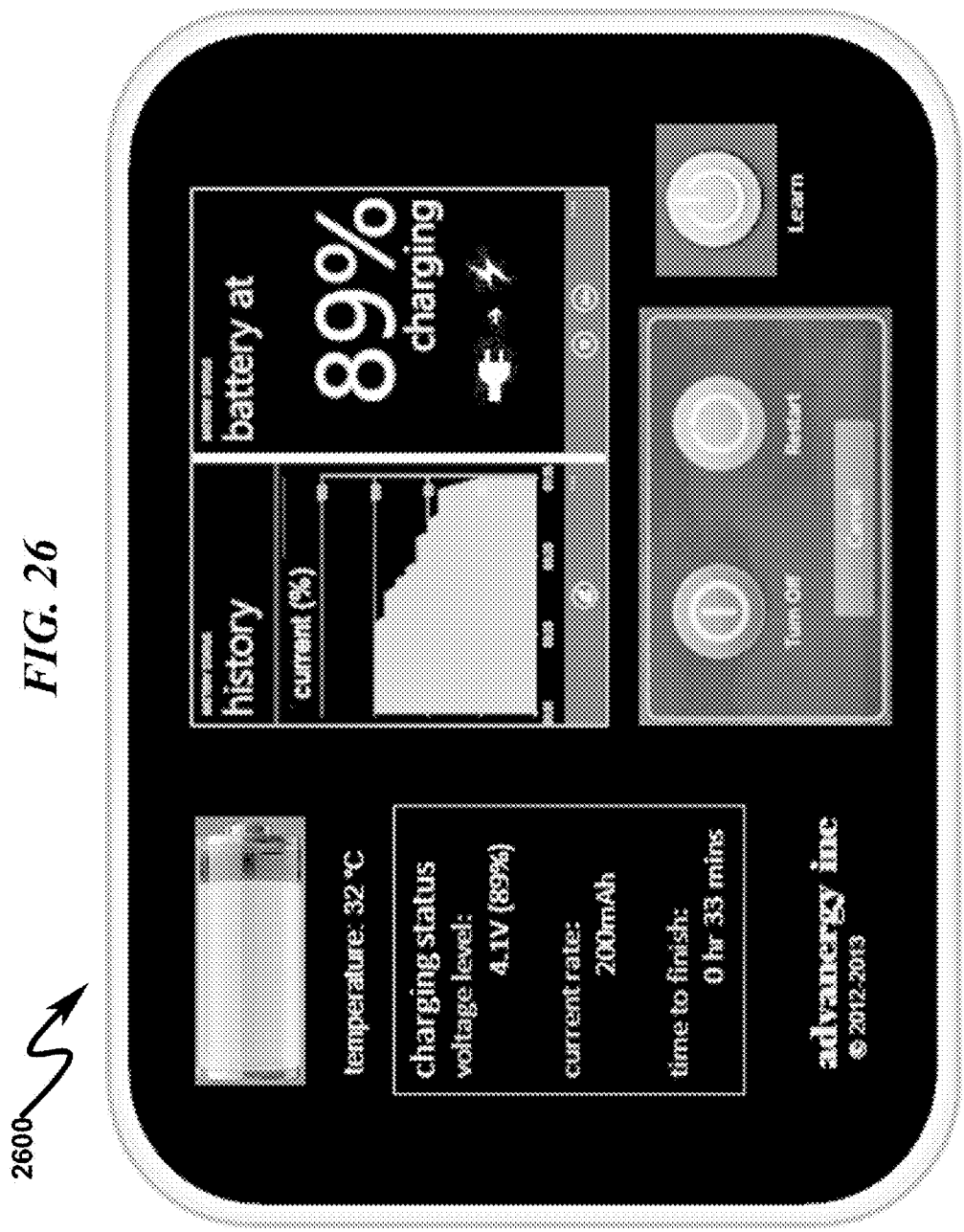
FIG. 26 illustrates an exemplary screenshot of remote web-based battery management software useful in some preferred invention embodiments.

As mentioned previously, some embodiments of the present invention may incorporate an integrated web hosting capability that permits remote access to the BCMD via the Internet using a standard web browser. An exemplary battery charger monitoring/control interface is depicted in FIG. 26 (2600).

Exemplary Mechanical Enclosure (2700)-(2800)

Figure 27:
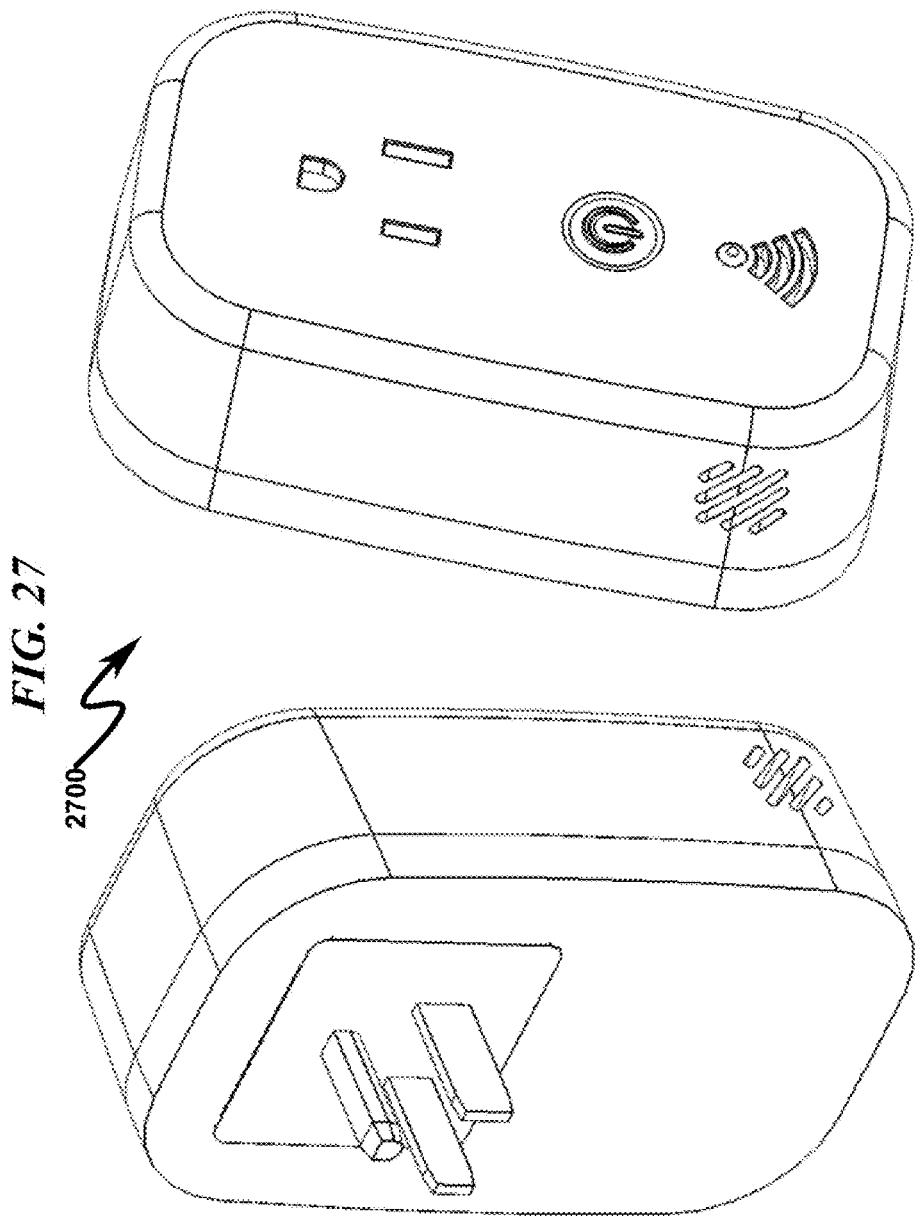
FIG. 27 illustrates an exemplary mechanical enclosure useful in some preferred invention embodiments.
Figure 28:
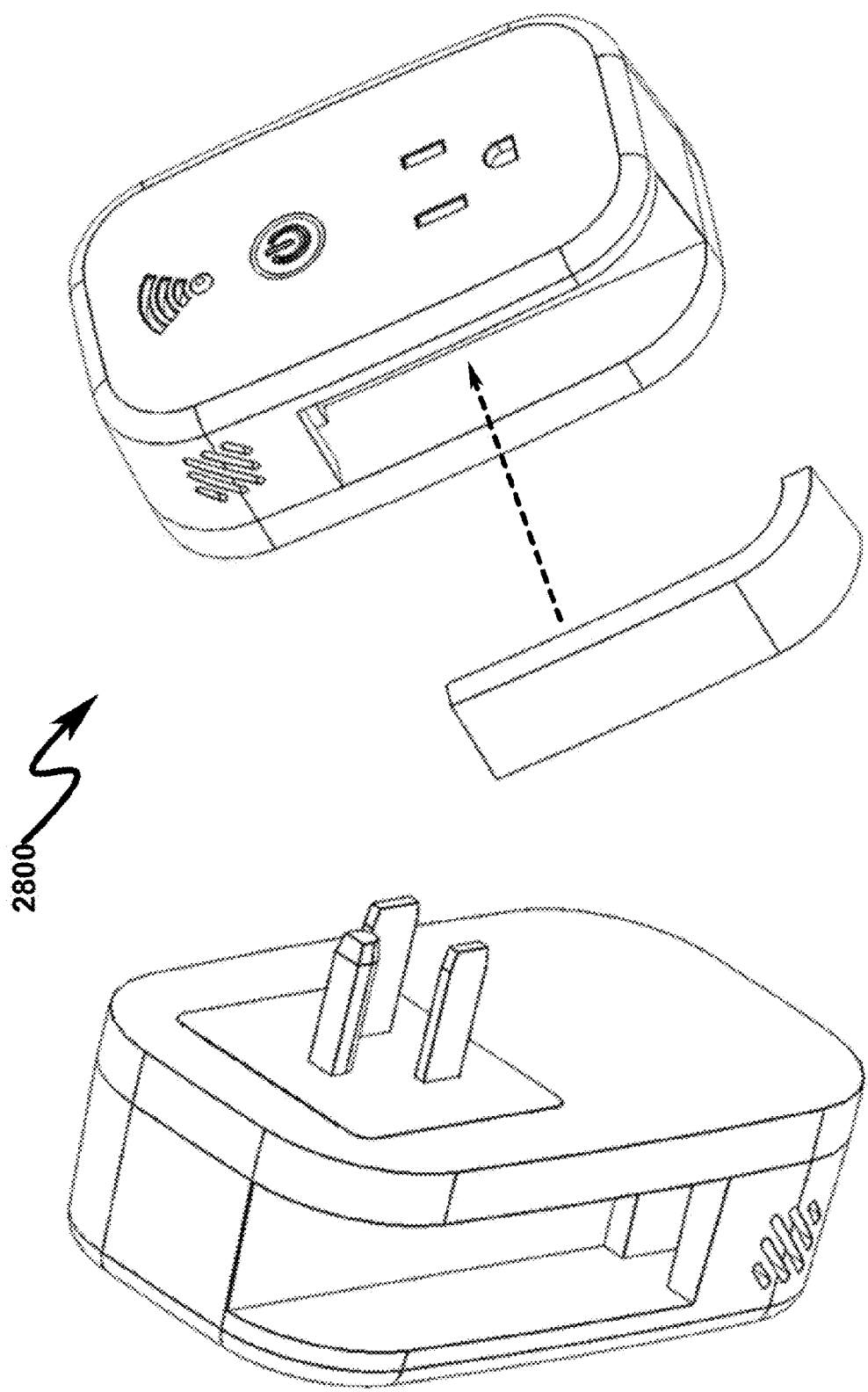
FIG. 28 illustrates an exemplary mechanical enclosure useful in some preferred invention embodiments incorporating a side panel supporting the incorporation of different wireless communication interface modules.

While the present invention may be embodied in a wide variety of enclosures, several are preferred. Several preferred embodiment enclosures are depicted in the detail perspective views of FIG. 27 (2700)-FIG. 28 (2800). FIG. 27 (2700) depicts a typical two-piece enclosure while FIG. 28 (2800) depicts an enclosure incorporating a side cover that may be used to install a variety of custom wireless communication interface modules, thus permitting the system to be adapted to support a wide variety of wireless communication protocols and networks.

Exemplary PCB Layout (2900)-(3200)

Figure 29:
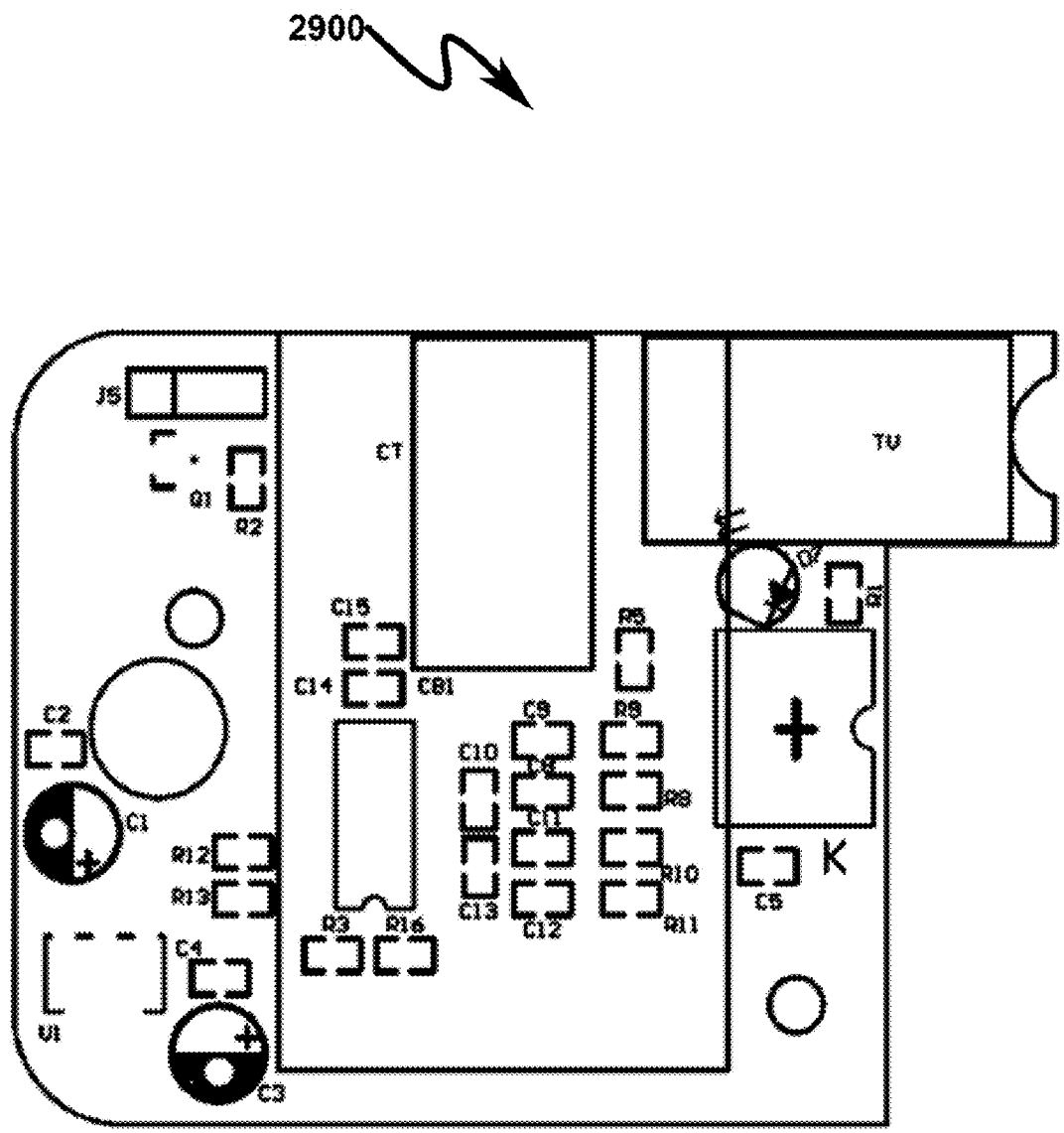
FIG. 29 illustrates an exemplary primary printed circuit board (PCB) silkscreen layout for an exemplary invention embodiment.
Figure 31:
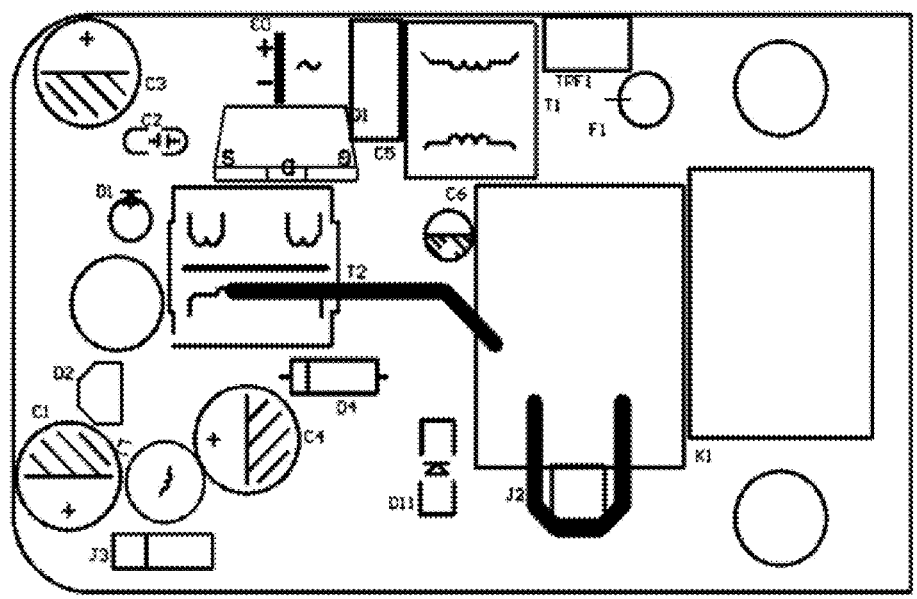
FIG. 31 illustrates an exemplary secondary printed circuit board (PCB) silkscreen layout for an exemplary invention embodiment.

While the present invention may be embodied in a wide variety of physical forms, several preferred embodiments utilize a number of printed circuit board (PCB) forms. An example of a preferred PCB configuration for an exemplary invention embodiment utilizing two separate circuit boards (primary and secondary) is provided in the primary circuit board layout views (silkscreen FIG. 29 (2900), top/bottom layers FIG. 30 (3000)) and the secondary circuit board layout views (silkscreen FIG. 31 (3100), top/bottom layers FIG. 32 (3200)). These layouts in conjunction with the schematics provided in FIG. 9 (0900)-FIG. 14 (1400) and the exemplary enclosures of FIG. 27 (2700) and FIG. 28 (2800) should provide one of ordinary skill in the art sufficient information to construct and operate the invention.

Preferred Embodiment System Summary

The present invention preferred exemplary system embodiment anticipates a wide variety of variations in the basic theme of construction, but can be generalized as a battery charger management system comprising:

(a) Power Source Control Unit (PSCU); and
(b) Power Monitor Control Unit (PMCU);
wherein
the PSCU further comprises an electrical power switch (EPS) configured to control electrical current supplied to a battery charging power supply (BCPS) supplying current to a battery under charge (BUC);
the PMCU is configured to measure the current consumed by the BCPS;
the PSCU is configured determine the characteristics of the BUC based on an analysis of the measured current;
the PSCU is configured determine the charge state of the BUC based on an analysis of the measured current; and
the PSCU is configured to activate the EPS in response to the measured current, the characteristics, and the charge state.

This general system summary may be augmented by the various elements described herein to produce a wide variety of invention embodiments consistent with this overall design description.

Preferred Embodiment Method Summary

The present invention preferred exemplary method embodiment anticipates a wide variety of variations in the basic theme of implementation, but can be generalized as a battery charger management method, the method operating in conjunction with a battery charger management system comprising:

(a) Power Source Control Unit (PSCU); and
(b) Power Monitor Control Unit (PMCU);
wherein
the PSCU further comprises an electrical power switch (EPS) configured to control electrical current supplied to a battery charging power supply (BCPS) supplying current to a battery under charge (BUC);
the PMCU is configured to measure the current consumed by the BCPS;

the PSCU is configured determine the characteristics of the BUC based on an analysis of the measured current;

the PSCU is configured determine the charge state of the BUC based on an analysis of the measured current; and the PSCU is configured to activate the EPS in response to the measured current, the characteristics, and the charge state;

wherein the method comprises the steps of:

(1) measuring the current consumed by the BCPS to produce a measured current profile (MCP);

(2) calculating a normalized current profile (NCP) from the MCP;

(3) optionally matching the NCP to known battery types and characteristics;

(4) determining a charge profile for the BUC based on the match or the NCP; and (5) executing the charge profile for the BUC by modulating the activation of the EPS.

One skilled in the art will recognize that these method steps may be augmented or rearranged without limiting the teachings of the present invention. This general method summary may be augmented by the various elements described herein to produce a wide variety of invention embodiments consistent with this overall design description.

Alternate Preferred Embodiment Method Summary

A present invention alternate preferred exemplary method embodiment anticipates a wide variety of variations in the basic theme of implementation, but can be generalized as a battery charger management method, the method operating in conjunction with a battery charger management system comprising:

(a) Power Source Control Unit (PSCU); and (b) Power Monitor Control Unit (PMCU); wherein the PSCU further comprises an electrical power switch (EPS) configured to control electrical current supplied to a battery charging power supply (BOPS) supplying current to a battery under charge (BUC);

the PMCU is configured to measure the current consumed by the BCPS;

the PSCU is configured determine the characteristics of the BUC based on an analysis of the measured current;

the PSCU is configured determine the charge state of the BUC based on an analysis of the measured current; and the PSCU is configured to activate the EPS in response to the measured current, the characteristics, and the charge state;

wherein the method comprises the steps of:

(1) determining if the PMCU has detected BCPS current consumption, and if not, proceeding to step (1);

(2) generating a BCPS measured current profile (MCP) based on the measured current;

(3) normalizing the MCP to produce a normalized measured current profile (NMCP);

(4) searching for a battery current profile match (BCPM) between the NMCP and known battery configurations to determine the type and charging characteristics of the BUC;

(5) determining if a BCPM is found, and if so, proceeding to step (7);

(6) reporting an unknown or bad battery configuration then proceeding to step (1);

(7) determining battery charging parameters based on the BCPM;

(8) determining if the BUC has been removed or disconnected from the BCPS, and if so, proceeding to step (1); and (9) executing a battery charging procedure based on the BCPM by modulating the activation of the EPS and proceeding to step (8).

One skilled in the art will recognize that these method steps may be augmented or rearranged without limiting the teachings of the present invention. This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the PSCU further comprises a communication interface configured to permit control of the PSCU via a remote mobile communication device (MCD), the communication interface selected from a group consisting of: USB hardware interface; UART hardware interface; serial hardware interface; parallel hardware interface; and Ethernet hardware interface.

An embodiment wherein the PSCU further comprises a communication interface configured to permit control of the PSCU via a remote mobile communication device (MCD), the communication interface selected from a group consisting of: wireless hardware interface; BLUETOOTH® wireless hardware interface; and wireless Ethernet hardware interface.

An embodiment wherein the MCD is selected from a group consisting of: laptop computer; tablet computer; personal computer; cellular phone; and smartphone.

An embodiment wherein the EPS activation is conditioned on the charge/discharge chemistry profile of the BUC.

An embodiment wherein the EPS activation is conditioned on the charge/discharge history profile of the BUC.

An embodiment wherein the EPS activation is conditioned on the temperature of the BUC.

An embodiment wherein the EPS activation is conditioned on the age of the BUC.

An embodiment wherein the PMCU and the PMCU are integrated within an enclosure containing the BCPS.

An embodiment wherein the PMCU is configured to compare the BOPS measured current to records contained in a battery database.

An embodiment wherein the battery database comprises information retrieved from an Internet-based web server.

One skilled in the art will recognize that other embodiments are possible based on combinations of elements taught within the above invention description.

Generalized Computer Usable Medium

As generally illustrated herein, the system embodiments of the present invention can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710,578), the present invention anticipates and includes this type of computer readable media within the scope of the invention. Pursuant to In re Nuijten, 500 F.3d 1346 (Fed. Cir. 2007) (U.S. patent application Ser. No. 09/211,928), the present invention scope is limited to computer readable media wherein the media is both tangible and non-transitory.

Conclusion

A battery charger management system/method implementing indirect execution of battery charging profiles has been disclosed. The system utilizes a power source control unit (PSCU) to selectively switch a power supply source to a battery charging power supply (BCPS) that charges a battery. A power monitor control unit (PMCU) monitors the current consumed by the BCPS and reports this to the PSCU. The BCPS current consumption provides the PSCU a profile of the charging characteristics of the battery attached to the BCPS, allowing identification of the battery type and a determination of the optimal charging profile for the battery in its current charge state. The power source to the BCPS is switched by the PCCU in accordance with the determined optimal charging profile to optimally charge the battery. The PSCU may operate independently or in conjunction with wireless commands received from a mobile communication device (MCD).

What is claimed is:

1. A battery charger management system comprising:
(a) Power Source Control Unit (PSCU); and
(b) Power Monitor Control Unit (PMCU);
wherein
said PSCU further comprises an electrical power switch (EPS) configured to control electrical current supplied to a battery charging power supply (BCPS) supplying current to a battery under charge (BUC);
said PMCU is configured to measure the current consumed by said BCPS and produce a measured current profile (MCP);
said PSCU is configured to indirectly determine the battery type and characteristics of said BUC based on an analysis of said MCP;
said PSCU is configured to determine the charge state of said BUC based on an analysis of said MCP;
said PSCU is configured to activate said EPS in response to said MCP, said battery type, said characteristics, and said charge state;
said PSCU is configured to calculate a normalized current profile (NCP) from said MCP;
said PSCU is configured to match said NCP to known battery types and known battery characteristics;
said PSCU is configured to determine a charge profile for said BUC based on said match or said NCP; and
said PSCU is configured to execute said charge profile for said BUC by modulating the activation of said EPS.

2. The battery charger management system of claim 1 wherein said PSCU further comprises a communication interface configured to permit control of said PSCU via a remote mobile communication device (MCD), said communication interface selected from a group consisting of: wireless hardware interface; BLUETOOTH® wireless hardware interface; and wireless Ethernet hardware interface.

3. The battery charger management system of claim 2 wherein said MCD is selected from a group consisting of: laptop computer; tablet computer; personal computer; cellular phone; and smartphone.

4. The battery charger management system of claim 1 wherein said EPS activation is conditioned on the charge/discharge chemistry profile of said BUC.

5. The battery charger management system of claim 1 wherein said EPS activation is conditioned on the charge/discharge history profile of said BUC.

6. The battery charger management system of claim 1 wherein said EPS activation is conditioned on the temperature of said BUC.

7. The battery charger management system of claim 1 wherein said EPS activation is conditioned on the age of said BUC.

8. The battery charger management system of claim 1 wherein said PSCU and said PMCU are integrated within an enclosure containing said BCPS.

9. The battery charger management system of claim 1 wherein said PMCU is configured to compare said BCPS measured current to records contained in a battery database.

10. The battery charger management system of claim 9 wherein said battery database comprises information retrieved from an Internet-based web server.

11. A battery charger management method, said method operating in conjunction with a battery charger management system (BCMS), said system comprising:
(a) Power Source Control Unit (PSCU); and
(b) Power Monitor Control Unit (PMCU);
wherein
said PSCU further comprises an electrical power switch (EPS) configured to control electrical current supplied to a battery charging power supply (BCPS) supplying current to a battery under charge (BUC);
said PMCU is configured to measure the current consumed by said BCPS;
said PSCU is configured to determine the characteristics of said BUC based on an analysis of said measured current;
said PSCU is configured to determine the charge state of said BUC based on an analysis of said measured current; and
said PSCU is configured to activate said EPS in response to said measured current, said characteristics, and said charge state;
wherein said method comprises the steps of:
(1) measuring the current consumed by said BCPS to produce a measured current profile (MCP);
(2) calculating a normalized current profile (NCP) from said MCP;
(3) optionally matching said NCP to known battery types and characteristics;
(4) determining a charge profile for said BUC based on said match or said NCP; and
(5) executing said charge profile for said BUC by modulating the activation of said EPS.

12. The battery charger management method of claim 11 wherein said PSCU further comprises a communication interface configured to permit control of said PSCU via a remote mobile communication device (MCD), said communication interface selected from a group consisting of: wireless hardware interface; BLUETOOTH® wireless hardware interface; and wireless Ethernet hardware interface.

13. The battery charger management method of claim 12 wherein said MCD is selected from a group consisting of: laptop computer; tablet computer; personal computer; cellular phone; and smartphone.

14. The battery charger management method of claim 11 wherein said EPS activation is conditioned on the charge/discharge chemistry profile of said BUC.

15. The battery charger management method of claim 11 wherein said EPS activation is conditioned on the charge/discharge history profile of said BUC.

16. The battery charger management method of claim 11 wherein said EPS activation is conditioned on the temperature of said BUC.

17. The battery charger management method of claim 11 wherein said EPS activation is conditioned on the age of said BUC.

18. The battery charger management method of claim 11 wherein said PSCU and said PMCU are integrated within an enclosure containing said BCPS.

19. The battery charger management method of claim 11 wherein said PMCU is configured to compare said BCPS measured current to records contained in a battery database.

20. The battery charger management method of claim 19 wherein said battery database comprises information retrieved from an Internet-based web server.

21. A battery charger management method, said method operating in conjunction with a battery charger management system, said system comprising:
(a) Power Source Control Unit (PSCU); and
(b) Power Monitor Control Unit (PMCU);
wherein
said PSCU further comprises an electrical power switch (EPS) configured to control electrical current supplied to a battery charging power supply (BCPS) supplying current to a battery under charge (BUC);
said PMCU is configured to measure the current consumed by said BCPS;
said PSCU is configured to determine the characteristics of said BUC based on an analysis of said measured current;
said PSCU is configured to determine the charge state of said BUC based on an analysis of said measured current; and
said PSCU is configured to activate said EPS in response to said measured current, said characteristics, and said charge state;
wherein said method comprises the steps of:
(1) determining if said PMCU has detected BCPS current consumption, and if not, proceeding to step (1);
(2) generating a BCPS measured current profile (MCP) based on said measured current;
(3) normalizing said MCP to produce a normalized measured current profile (NMCP);
(4) searching for a battery current profile match (BCPM) between said NMCP and known battery configurations to determine the type and charging characteristics of said BUC;
(5) determining if a BCPM is found, and if so, proceeding to step (7);
(6) reporting an unknown or bad battery configuration then proceeding to step (1);
(7) determining battery charging parameters based on said BCPM;
(8) determining if said BUC has been removed or disconnected from said BCPS, and if so, proceeding to step (1); and
(9) executing a battery charging procedure based on said BCPM by modulating the activation of said EPS and proceeding to step (8).

22. The battery charger management method of claim 21 wherein said PSCU further comprises a communication interface configured to permit control of said PSCU via a remote mobile communication device (MCD), said communication interface selected from a group consisting of: wireless hardware interface; BLUETOOTH® wireless hardware interface; and wireless Ethernet hardware interface.

23. The battery charger management method of claim 22 wherein said MCD is selected from a group consisting of: laptop computer; tablet computer; personal computer; cellular phone; and smartphone.

24. The battery charger management method of claim 21 wherein said EPS activation is conditioned on the charge/discharge chemistry profile of said BUC.

25. The battery charger management method of claim 21 wherein said EPS activation is conditioned on the charge/discharge history profile of said BUC.

26. The battery charger management method of claim 21 wherein said EPS activation is conditioned on the temperature of said BUC.

27. The battery charger management method of claim 21 wherein said EPS activation is conditioned on the age of said BUC.

28. The battery charger management method of claim 21 wherein said PSCU and said PMCU are integrated within an enclosure containing said BCPS.

29. The battery charger management method of claim 21 wherein said PMCU is configured to compare said BCPS measured current to records contained in a battery database.

30. The battery charger management method of claim 29 wherein said battery database comprises information retrieved from an Internet-based web server.

\* \* \* \* \*